(12) United States Patent
Cai et al.

(10) Patent No.: US 10,611,218 B2
(45) Date of Patent: Apr. 7, 2020

(54) BED COVER OF PICK-UP TRUCK

(71) Applicant: WENZHOU CHAOMING AUTO PARTS CO., LTD., Zhejiang (CN)

(72) Inventors: Lanhua Cai, Zhejiang (CN); Yi Lin, Zhejiang (CN); Kexin Shi, Zhejiang (CN)

( * ) Notice: Subject to any disclaimer, the term of this patent is extended or adjusted under 35 U.S.C. 154(b) by 0 days.

(21) Appl. No.: 15/928,106

(22) Filed: Mar. 22, 2018

(65) Prior Publication Data

US 2019/0291551 A1 Sep. 26, 2019

(51) Int. Cl.
*B60J 7/16* (2006.01)
*B60J 7/10* (2006.01)

(52) U.S. Cl.
CPC ............ *B60J 7/1607* (2013.01); *B60J 7/106* (2013.01)

(58) Field of Classification Search
CPC ... B60J 7/14; B60J 7/1607; B60J 7/106; B60J 7/10; B60J 7/12; B60P 7/02
See application file for complete search history.

(56) References Cited

U.S. PATENT DOCUMENTS

2014/0152046 A1* 6/2014 Facchinello ............ B60J 7/141
296/100.06

* cited by examiner

*Primary Examiner* — D Glenn Dayoan
*Assistant Examiner* — Melissa Ann Bonifazi
(74) *Attorney, Agent, or Firm* — HYIP; Jie Yang

(57) ABSTRACT

A bed cover of pick-up truck including a frame structure and the skin covering the frame structure is provided. The frame structure consist of several frames and at least one rotating shaft system to connect two adjacent frames, And the rotating shaft system contains: a middle rod, a left joint, a right joint, a middle joint and a joint fixed plate; the left joint, the right joint and the middle joint are respectively provided with the rotating shaft part. The rotating shaft parts of the left joint and the right joint together with the middle joint make a rotating shaft. The middle joint is fixed with the joint fixed plate. The left and the right joint are also fixed with the middle rod to fix the whole rotating shaft system. This invention has the advantages of original design, ingenious structures, simple and durable installation, solid waterproof tape etc.

10 Claims, 25 Drawing Sheets

BED COVER OF PICK-UP TRUCK

BACKGROUND OF THE INVENTION

The invention relates to a pickup truck accessory, in particular to a bed cover of pick-up truck.

The pick-up truck is a type of car with a car's head cab and an open container. They are popular with consumers due to their beautiful appearance, car like comfortability, strong driving force, low price, and practicability of carrying both people and cargo.

However, the bed cover of pick-up truck is a open type, so the goods in it are easy to be exposed to the sun and rain. These disadvantages affect the popularization and use of pick-up truck. At present, the main shortcomings of the soft fold-three-time bed cover of pick-up truck on the market are that the tape is easy to fall off and the installation is very complex.

BRIEF SUMMARY OF THE INVENTION

The invention aims to provide a bed cover of pick-up truck to overcome the present shortcomings.

To achieve the above purpose, the invention provides a bed cover of pick-up truck, including a frame structure and the skin covering the frame structure. The frame structure consist of several frames and at least one rotating shaft system to connect two adjacent frames. And the rotating shaft system contains: a middle rod, a left joint, a right joint, a middle joint and a joint fixed plate; the left joint, the right joint and the middle joint are respectively provided with the rotating shaft part. The rotating shaft parts of the left joint and the right joint together with the middle joint make a rotating shaft. Meanwhile, the middle joint has a limiting effect on the left joint and the right joint. The middle joint is fixed with the joint fixed plate and locks the position of the left joint and the right joint between the middle joint and joint fixed plate; the left and right joint are also fixed with the middle rod to fix the whole rotating shaft system. Preferably, the shaft system consists of a large rotating shaft system and a small rotating shaft system. The frame consists of a first rectangular frame, a second rectangular frame, and a third rectangular frame.

There are circular grooves on both sides for middle joint. The rotating shaft parts of the left joint and the right joint together with the middle joint are coaxially assembled in the position of the circular groove on one side of the middle joint to form a rotating shaft; The left joint and the right joint are respectively provided with a rotating shaft connecting arm which is connected with the rotating shaft part. When the rotating shaft rotates, the connecting arm of the left joint shaft and the right joint will collide with the edge of the circular groove of the middle joint so as to play a limiting role; The lower part of the left joint, the right joint and the middle joint are respectively provided with gaskets, each joint and its connecting gaskets are all in one structure. Preferably, the left joint is provided with a left joint fixing part. One side of fixing part near the middle joint is provided with a convex rotating shaft part, and the shaft part is connected to the fixing part by the rotating shaft connecting arm of left joint. The other side of the left joint fixing part is provided with a plug and a gasket is fixed below the left joint fixing part. The right joint is provided with fixing part, rotating shaft part, rotating shaft connection arm, plug and gasket as well. The fixing part of the left joint and the right joint are hollow inside. The two sides of the middle joint are respectively provided with circular grooves. The front of the middle joint is a vertical wall, and the back is a hollow shell. A rotating space is formed between the middle joint and the rotating shaft of the left joint as well as the right joint. And the rotation space is isolated from the hollow interior of the middle joint. The left joint and the right joint can be inserted into the rotating space with the rotating center of the rotating shaft part.

The middle joint is provided with threaded inserts, and the fixing plate of the joint is provided with a hole and a cylindrical groove structure; the threaded inserts on the middle joint together with the hole on the joint fixed plate is coaxially assembled and tightened by the screw to lock the left, right joint in the circular groove structure of middle joint and cylindrical groove structure of joint fixed plate.

There is also a square convex structure on the joint fixed plate, and the middle rod is provided with square cavity. The square convex structure is inserted into the square cavity of the middle rod to fix the whole rotating shaft system.

The frame is made up of two vertical bars and two or more horizontal bars; the vertical bars of adjacent two frames are connected by rotating shaft system; the horizontal bar is a kind of front, behind bar and middle rod or stiffener system; two ends of middle rod are fixed with the left or right joint of the rotating shaft system on the vertical bar; the front, back bar is fixed with the vertical bar by corner joint; the two ends of stiffener system is fixed directly with the vertical bar. The corner joint comprises a base angle with the shape of right angle sector as the body and a convex corner joint plug arranged at the two ends of the body. The gasket is arranged below the corner joint body. The front and back bar are both long rod structures on whose sides there is a cavity extending along it. The end face of the long rod is provided with a groove and socket. A tape is arranged in the groove in the front, back, left and right bar so as to fix the tape on the front and back bar or the left and right bar. The tape is waterproof and contains I-shaped structure and the droop part under the structure. The cross section of the I-shaped structure is the I shape.

The middle rod is provided with a parallel double rods structure, and two ends of one bar are respectively fixed with the left joint of the rotating shaft system on vertical bars of both sides, the two ends the other bar are respectively fixed with the right joint of the rotating shaft system on vertical bars of both sides; The left joint and the right joint are respectively provided with a square convex structure, and the double rods of the middle rod are provided respectively with a square cavity. The square convex structure is inserted respectively into the square cavity of the double bars of the middle bar to fix the whole rotating shaft system.

The stiffener system is composed of two bars bar sliding fixed blocks, two wrench sliding blocks, two wrench sliding rods, two wrenches, two flat head threaded rods and a stiffener; the wrench is fixed in stiffener. The role of the stiffener is to strengthen the whole bed cover of the pick-up truck at first, then the wrench can be put into stiffener to be fixed.

There is a long groove extending along the stiffener in the stiffener, two ends of the groove are respectively provided with bar sliding fixed blocks in which there is a chute consistent with the direction of the length of the groove and has the same width of the groove. The two ends of the chute are provided with barriers, there is a slotted-hole-shape groove on the barriers between the groove of the stiffener and the chute of the bar sliding fixed block. The block of the other end of the bar sliding fixed block is provided with a fixed block plug with which the stiffer system can clamp into the cavity of the left and right bar to slide along the left and right bar. The wrench sliding rod is in the chute, the lower part of the wrench sliding block is provided with a transverse hole consistent with the length direction of the rod and is sheathed on the wrench sliding rod through it. The upper part of the wrench sliding block is provided with two parallel vertical plates and between the plates there are some grooves. There is a longitudinal hole perpendicular to the length direction of a wrench sliding rod at the same position; binding head thread rod is composed of a binding head and a rod body. There is a hole on the flat head and the head is clamped between the two vertical plates on the upper part of the wrench sliding block. The hole is fixed with the longitudinal hole on the two vertical plate by a short shaft, and there is a thread section on the rod; the wrench is connected with the thread section on the binding head screw rod and is clamped into the groove of the stiffener by clamping the slotted-hole-shape groove through the binding head threaded rod; the wrench also can slide through a binding head thread rod in the stiffener and is fixed with the wrench bar sliding fixed block by binding head hole of the binding head thread rod so that the wrench can move along with the wrench sliding block sliding on the wrench sliding rod.

The wrench comprises a supporting shell, a wrench shaft, a roller, a handle component, and a cylindrical thread bolt; the handle component comprises a handle rod and at the top of it there are two parallel 7-shaped wrench mounting plates. The handle component is preferred for plastic material. The center of the handle rod is provided with a inward central hole perpendicular to the ends of the rod. There is a iron rod to strengthen the plastic handle rod in the hole. The body of the rod is provided with wave structure for finger print to improve the comfort of holding the rod. The wrench mounting plate is perpendicular to the end of the handle rod. One end of the upper transverse part of the 7-shaped wrench mounting plate is provided with a large hole, and the other end is provided with a small hole. There is a cylindrical thread bolt in the big hole of the two wrench mounting plate, thread holes are installed on the cylindrical thread bolts between the two wrench mounting plates, there is a wrench rotating shaft in the small hole of two wrench mounting plate, a roller is installed on the wrench rotating shaft between the two wrench mounting plates; the supporting shell on whose top there is a wrench thread insert is buckled outside the wrench mounting plate on the upper part of the handle component, the wrench thread insert and the supporting shell are provided with a through-hole. A cavity pocket is provided in the supporting shell and there is arc-shaped groove in the inner wall of the cavity pocket. Both sides outside the supporting shell is provided with a barbed buckle structure, and the other outer wall is provided with a flat gear lever; The handle component can drive the vertical movement of the supporting shell to fix the wrench on the side bar of the frame for the pick-up truck bed cover and it is limited by supporting shell. The handle component can also rotate through the roller in the supporting shell, to stick the wrench on the supporting shell.

The cylindrical thread bolt is connected with a binding head thread rod. The binding head thread rod is inserted into the support shell from the through-hole of the wrench thread insert and the supporting shell and engaged with the thread hole on the cylindrical thread bolt between the two wrench mounting plates through its thread section to fix the wrench on the binding thread rod.

The rotation of the cylindrical thread bolt drives the vertical movement of the handle component in the supporting shell. When the roller is against the upper surface of the cavity pocket in the supporting shell, the supporting shell is driven to move vertically to clamp the buckle structure with the side bar of the frame for the pick-up truck bed cover and limit the handle component by flat gear lever on the supporting shell; The handle component rotates in the supporting shell through the roller, thus makes the handle component be able to rotate 90 degrees in the support shell to stick the wrench on the support shell.

This invention overcomes the disadvantages of bed cover of pick-up truck and has the advantages of original design, ingenious structures, simple and durable installation, solid waterproof tape etc. This invention also has a frame structure and the skin covering the frame structure. The frame structure consist of several frames and at least one rotating shaft system to connect two adjacent frames. And the rotating shaft system contains: a middle rod, a left joint, a right joint, a middle joint and a joint fixed plate. A rotating space is formed between the middle joint and the rotating shaft of the left joint as well as the right joint. And the rotation space is isolated from the hollow interior of the middle joint. The left joint and the right joint can be inserted into the rotating space with the rotating center of the rotating shaft part. The separation of the rotating space from the inner part of middle joint can prevent the water falling into the rotating space of the rotating shaft system from penetrating the inner part of the rotating shaft system. There is no need for additional waterproof bars in the rotating shaft system. The structure is simple with excellent waterproof performance.

BRIEF DESCRIPTION OF THE DRAWINGS

FIG. 9-1 is the illustration of its right joint in the rotating shaft system.
FIG. 9-2 is the vertical view of its right joint in the rotating shaft system.
FIG. 9-3 is the side view of its right joint in the rotating shaft system.
FIG. 9-4 is the front view of its right joint in the rotating shaft system.
FIG. 10-1 is the illustration of its small middle joint in the small rotating shaft system.
FIG. 10-2 is the side view of its small middle joint in the small rotating shaft system.
FIG. 10-3 is the front view of its small middle joint in the small rotating shaft system.
FIG. 10-4 is the vertical view of its small middle joint in the small rotating shaft system.
FIG. 11-1 is the illustration of its left joint in the rotating shaft system.
FIG. 11-2 is the side view of its left joint in the rotating shaft system.
FIG. 11-3 is the front view of its left joint in the rotating shaft system.
FIG. 11-4 is the vertical view of its left joint in the rotating shaft system.
FIG. 12-1 is the illustration of its large middle joint in the large rotating shaft system.

FIG. 12-2 is the side view of its large middle joint in the large rotating shaft system.

FIG. 12-3 is the front view of its large middle joint in the large rotating shaft system.

FIG. 12-4 is the vertical view of its large middle joint in the large rotating shaft system.

FIG. 13-1 is the illustration of its corner joint.

FIG. 13-2 is the vertical view illustration of its corner joint.

FIG. 13-3 is the side view of its corner joint.

FIG. 13-4 is the front view of its corner joint.

FIG. 15-1 is the illustration of its wrench supporting shell.

FIG. 15-2 is the bottom view of its wrench supporting shell.

FIG. 15-3 is the front view of its wrench supporting shell.

FIG. 15-4 is the stereogram of its wrench supporting shell.

FIG. 18-1 is the illustration of its fixed plate for large joint.

FIG. 18-2 is the front view of its fixed plate for large joint.

FIG. 18-3 is the side view of its fixed plate for large joint.

FIG. 18-4 is the vertical view of its fixed plate for large joint.

FIG. 19-1 is the illustration of its fixed plate for small joint.

FIG. 19-2 is the front view of its fixed plate for small joint.

FIG. 19-3 is the side view of its fixed plate for small joint.

FIG. 19-4 is the vertical view of its fixed plate for small joint.

FIG. 20-1 is the illustration of its wrench sliding block for stiffener.

FIG. 20-2 is the front view of its wrench sliding block for stiffener.

FIG. 20-3 is the side view of its wrench sliding block for stiffener.

FIG. 21-1 is the illustration of its bar sliding fixed block for stiffener.

FIG. 21-2 is the side view of its bar sliding fixed block for stiffener.

FIG. 21-3 is the vertical view of its bar sliding fixed block for stiffener.

FIG. 21-4 is the front view of its bar sliding fixed block for stiffener.

Figure 1:
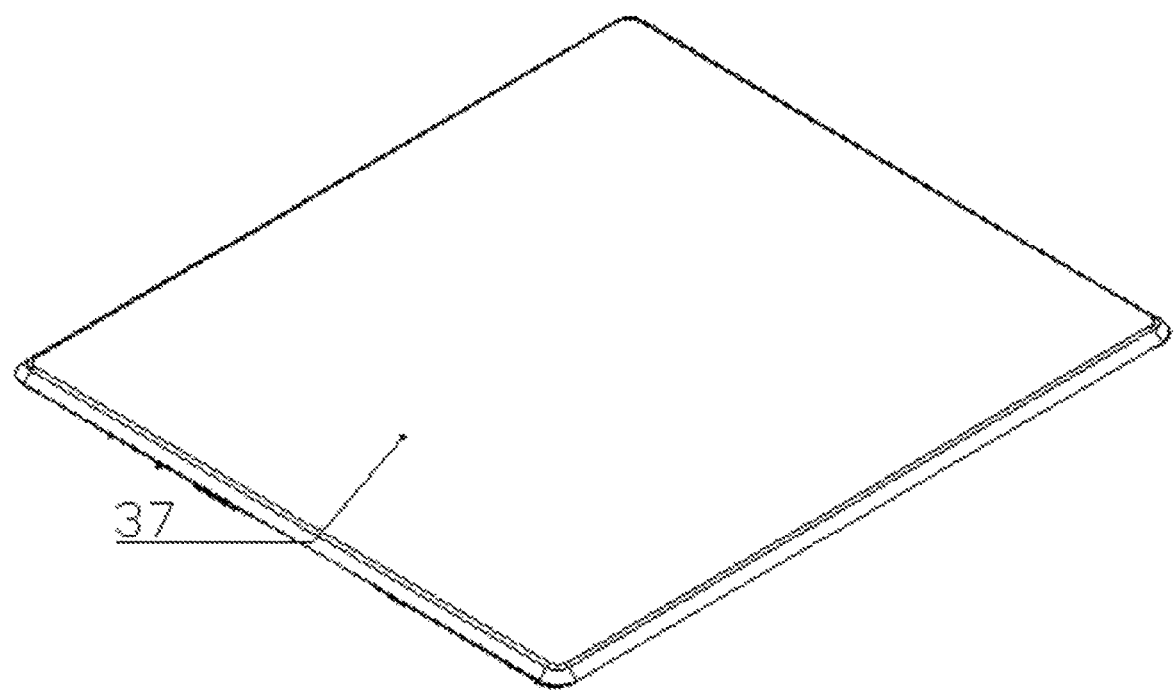
FIG. 1 is the overall illustration of the bed cover for pick-up truck.

In the figures: 1. the first rectangle frame; 2. the second rectangular frame; 3. the third rectangular frame; 4. front and back bar; 401. cavity; 402. bar groove; 403. bar sucket; 5. corner joint; 501. corner joint plug; 502. corner joint body; 503. corner joint gasket; 6. The first left and right bar; 7. large rotating shaft system; 8. the fixed buckle structure; 9. the second of left and right bar; 10. the small rotating shaft system; 11. the third left and right bar; 12. stiffener system; 13. the middle rod; 14. left joint; 1401. rotating shaft part of the left joint; 1402. the left joint plug; 1403. rotating shaft connection arm of the left joint; 1404. the left joint gasket; 1405. square convex of the left joint; 15. small middle joint; 1501. the second circular groove; 1502. the second thread inserts; 1503. second rectangular holes; 1504. small middle joint gasket; 1505. the second limit surface; 16. right joint; 1601. right joint rotating shaft part; 1602. right joint plug; 1603. rotating shaft connection arm for right joint; 1604. right joint gasket; 1605. square convex of the right joint; 117. large middle joint; 1701. the first circular groove; 1702. the first thread insert; 1703. the first rectangular hole; 1704. the large middle joint gasket; 1705. the circular hole; 1706. the first limit surface; 18. the large joint fixed plate; 1801. the first circular hole; 1802. the first rectangular convex; 1803. the first hole; 1804. the first square convex; 1805. the cylindrical convex; 19. small joint fixed plate; 1901. the second circular hole; 1902. the second rectangular convex; 1903. the second hole; 1904. the second square convex; 20. The sliding block of the wrench; 2001. the transverse hole; 2002. the longitudinal hole; 2003. groove; 21. wrench sliding rod; 22. wrench; 23. bar sliding fixed block; 2301. fixed block plugs; 2302. sliding rod fixing hole; 2303. riveting fixing holes; 2304. slotted-hole-shape groove; 24. stiffener; 25. frame structure; 26. tape; 2601. I-shaped structure; 2602. droop part; 27. wrench rotating shaft part; 28. supporting shell; 2801. the wrench thread insert; 2802. bar buckle; 2803. cavity; 2804. flat gear lever; 2805. arc-shaped grooves; 29. binding head thread rod; 2901. thread part; 2902. flat head hole; 30. roller; 3001. roller hole; 31. handle component; 3101. big hole; 3102. the center hole; 3103. small hole; 3104. wave shape structure; 32. cylindrical thread bolt; 3201. thread hole; 33. fixing buckle; 34. T-shaped rod; 35. fixed upper clip; 36. triangle nut; 37. skin; 38 short shaft.

DETAILED DESCRIPTION OF THE INVENTION

Illustrative embodiments of the invention are described below. Referring now to the drawings, the present invention provides a bed cover of pick-up truck, including a frame structure 25 and the skin 37 covering the frame structure. The frame structure 25 consist of several frames and at least one rotating shaft system to connect two adjacent frames. And the rotating shaft system contains: a middle rod 13, a left joint 14, a right joint 16, a middle joint and a joint fixed plate; the left joint 14, the right joint 16 and the middle joint are respectively provided with the rotating shaft part. The rotating shaft parts of the left joint 14 and the right joint 16 together with the middle joint make a rotating shaft. Meanwhile, the middle joint has a limiting effect on the left joint 14 and the right joint 16. The middle joint is fixed with the joint fixed plate and locks the position of the left joint 14 and the right joint 16 between the middle joint and joint fixed plate; the left and right joint are also fixed with the middle rod 13 to fix the whole rotating shaft system. Preferably, the shaft system consists of a large rotating shaft system 7 and a small rotating shaft system 10. The frame consists of a first rectangular frame 1, a second rectangular frame 2, and a third rectangular frame 3.

There are circular grooves on both sides for middle joint. The rotating shaft parts of the left joint 14 and the right joint 16 together with the middle joint are coaxially assembled in the position of the circular groove on one side of the middle joint to form a rotating shaft; The left joint 14 and the right joint 16 are respectively provided with a rotating shaft connecting arm which is connected with the rotating shaft part. When the rotating shaft rotates, the connecting arm of the left joint shaft 1403 and the right joint 1603 will collide with the edge of the circular groove of the middle joint so as to play a limiting role; The lower part of the left joint 14, the right joint 16 and the middle joint are respectively provided with gaskets, each joint and its connecting gaskets are all in one structure. Preferably, the left joint 14 is provided with a left joint fixing part. One side of fixing part near the middle joint is provided with a convex rotating shaft part 1401, and the shaft part 1401 is connected to the fixing part by the rotating shaft connecting arm of left joint 1403. The other side of the left joint fixing part is provided with a plug 1402 and a gasket 1404 is fixed below the left joint fixing part. The right joint 16 is provided with fixing part, rotating shaft part 1601, rotating shaft connection arm 1603, plug 1602 and gasket 1604 as well. The fixing part of the left joint and the right joint are hollow inside. The two sides of the middle joint are respectively provided with circular grooves. The front of the middle joint is a vertical wall, and the back is a hollow shell. A rotating space is formed between the middle joint and the rotating shaft of the left joint 14 as well as the right joint 16. And the rotation space is isolated from the hollow interior of the middle joint. The left joint 14 and the right joint 16 can be inserted into the rotating space with the rotating center of the rotating shaft part.

The middle joint is provided with threaded inserts, and the fixing plate of the joint is provided with a hole and a cylindrical groove structure; the threaded inserts on the middle joint together with the hole on the joint fixed plate is coaxially assembled and tightened by the screw to lock the left joint 14, right joint 16 in the circular groove structure of middle joint and cylindrical groove structure of joint fixed plate.

There is also a square convex structure on the joint fixed plate, and the middle rod 13 is provided with square cavity. The square convex structure is inserted into the square cavity of the middle rod 13 to fix the whole rotating shaft system.

The frame is made up of two vertical bars and two or more horizontal bars; the vertical bars of adjacent two frames, in other words, the left and right bar are connected by rotating shaft system; the horizontal bar is a kind of front, behind bar 4 and middle rod 13 or stiffener system 12; two ends of middle rod 13 are fixed with the left joint 14 or the right joint 16 of the rotating shaft system on the vertical bar; the front, back bar 4 is fixed with the vertical bar by corner joint 5; the two ends of stiffener system 12 is fixed directly with the vertical bar. The corner joint 5 comprises a base angle with the shape of right angle sector as the body 502 and a convex corner joint plug 501 arranged at the two ends of the body 502. The gasket 503 is arranged below the corner joint body 502. The front and back bar 4 are both long rod structures on whose sides there is a cavity 401 extending along it. The end face of the long rod is provided with a groove and socket 403. A tape is arranged in the groove 402 in the front, back, left and right bar so as to fix the tape 26 on the front and back bar 4 or the left and right bar. The tape 26 is waterproof and contains I-shaped structure 2601 and the droop part 2602 under the structure 2601. The cross section of the I-shaped structure 2601 is the I shape.

The middle rod 13 is provided with a parallel double rods structure, and two ends of one bar are respectively fixed with the left joint 14 of the rotating shaft system on vertical bars of both sides, the two ends the other bar are respectively fixed with the right joint 16 of the rotating shaft system on vertical bars of both sides; The left joint 14 and the right joint 16 are respectively provided with a square convex structure, and the double rods of the middle rod 13 are provided respectively with a square cavity. The square convex structure is inserted respectively into the square cavity of the double bars of the middle bar 13 to fix the whole rotating shaft system.

The stiffener system 12 is composed of two bars bar sliding fixed blocks 23, two wrench sliding blocks 20, two wrench sliding rods 21, two wrenches 22, two flat head threaded rods 29 and a stiffener 24; the wrench 22 is fixed in stiffener 24. The role of the stiffener 24 is to strengthen the whole bed cover of the pick-up truck at first, then the wrench 22 can be put into stiffener 24 to be fixed.

There is a long groove extending along the stiffener in the stiffener 24, two ends of the groove are respectively provided with bar sliding fixed blocks 23 in which there is a chute consistent with the direction of the length of the groove and has the same width of the groove. The two ends of the chute are provided with barriers, there is a slotted-hole-shape groove 2304 on the barriers between the groove of the stiffener and the chute of the bar sliding fixed block 23. The block of the other end of the bar sliding fixed block 23 is provided with a fixed block plug 2301 with which the stiffer system 12 can clamp into the cavity 401 of the left and right bar to slide along the left and right bar. The wrench sliding rod 21 is in the chute, the lower part of the wrench sliding block 20 is provided with a transverse hole 2001 consistent with the length direction of the rod 21 and is sheathed on the wrench sliding rod 21 through it. The upper part of the wrench sliding block 20 is provided with two parallel vertical plates and between the plates there are some grooves 2003. There is a longitudinal hole 2002 perpendicular to the length direction of a wrench sliding rod 21 at the same position; binding head thread rod 29 is composed of a binding head and a rod body. There is a hole 2902 on the flat head and the head is clamped between the two vertical plates on the upper part of the wrench sliding block 20. The hole 2902 is fixed with the longitudinal hole 2002 on the two vertical plate by a short shaft 38, and there is a thread section 2901 on the rod; the wrench 22 is connected with the thread section 2901 on the binding head screw rod 29 and is clamped into the groove of the stiffener by clamping the slotted-hole-shape groove 2304 through the binding head threaded rod 29; the wrench 22 also can slide through a binding head thread rod 29 in the stiffener 24 and is fixed with the wrench bar sliding fixed block 20 by binding head hole 2902 of the binding head thread rod 29 so that the wrench 22 can move along with the wrench sliding block 20 sliding on the wrench sliding rod 21.

The wrench 22 comprises a supporting shell 28, a wrench shaft 28, a roller 30, a handle component 31, and a cylindrical thread bolt 32; the handle component 31 comprises a handle rod and at the top of it there are two parallel 7-shaped wrench mounting plates. The handle component 31 is preferred for plastic material. The center of the handle rod is provided with a inward central hole 3102 perpendicular to the ends of the rod. There is a iron rod to strengthen the plastic handle rod in the hole 3102. The body of the rod is provided with wave structure 3104 for finger print to improve the comfort of holding the rod. The wrench mounting plate is perpendicular to the end of the handle rod. One end of the upper transverse part of the 7-shaped wrench mounting plate is provided with a large hole 3101, and the other end is provided with a small hole 3103. There is a cylindrical thread bolt 32 in the big hole 3101 of the two wrench mounting plate, thread holes 3201 are installed on the cylindrical thread bolts 32 between the two wrench mounting plates, there is a wrench rotating shaft in the small hole 3103 of two wrench mounting plate, a roller 30 is installed on the wrench rotating shaft 27 between the two wrench mounting plates; the supporting shell 28 on whose top there is a wrench thread insert 2801 is buckled outside the wrench mounting plate on the upper part of the handle component 31, the wrench thread insert 2801 and the supporting shell 28 are provided with a through-hole. A cavity pocket 2803 is provided in the supporting shell 28 and there is arc-shaped groove 2805 in the inner wall of the cavity pocket 2803. Both sides outside the supporting shell is provided with a barbed buckle 2802 structure, and the other outer wall is provided with a flat gear lever 2804; The handle component 31 can drive the vertical movement of the supporting shell 28 to fix the wrench 22 on the side bar of the frame for the pick-up truck bed cover and it is limited by supporting shell 28. The handle component 31 can also rotate through the roller 30 in the supporting shell, to stick the wrench 22 on the supporting shell 28.

The cylindrical thread bolt 32 is connected with a binding head thread rod 29. The binding head thread rod 29 is inserted into the support shell 28 from the through-hole of the wrench thread insert 2801 and the supporting shell 28 and engaged with the thread hole 3201 on the cylindrical thread bolt 32 between the two wrench mounting plates through its thread section to fix the wrench 22 on the binding thread rod 29.

The rotation of the cylindrical thread bolt 32 drives the vertical movement of the handle component 31 in the supporting shell 28. When the roller 30 is against the upper surface of the cavity pocket 2803 in the supporting shell 28, the supporting shell 28 is driven to move vertically to clamp the buckle structure 2802 with the side bar of the frame for the pick-up truck bed cover and limit the handle component 31 by flat gear lever on the supporting shell 28; The handle component 31 rotates in the supporting shell 28 through the roller 30, thus makes the handle component 31 be able to rotate 90 degrees in the support shell 28 to stick the wrench 22 on the supporting shell 28.

Now we will further illustrate the bed cover of the pick-up truck provided by the invention with the examples.

Example 1

Figure 2:
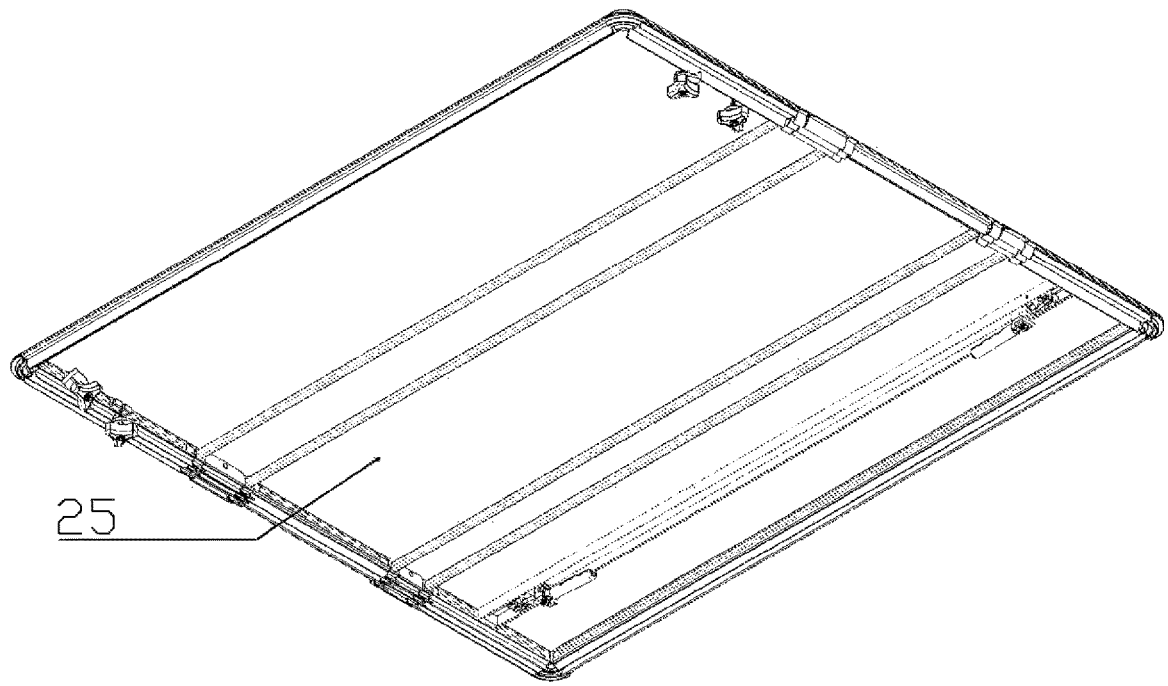
FIG. 2 is the overall illustration of its frame structure.
Figure 3:
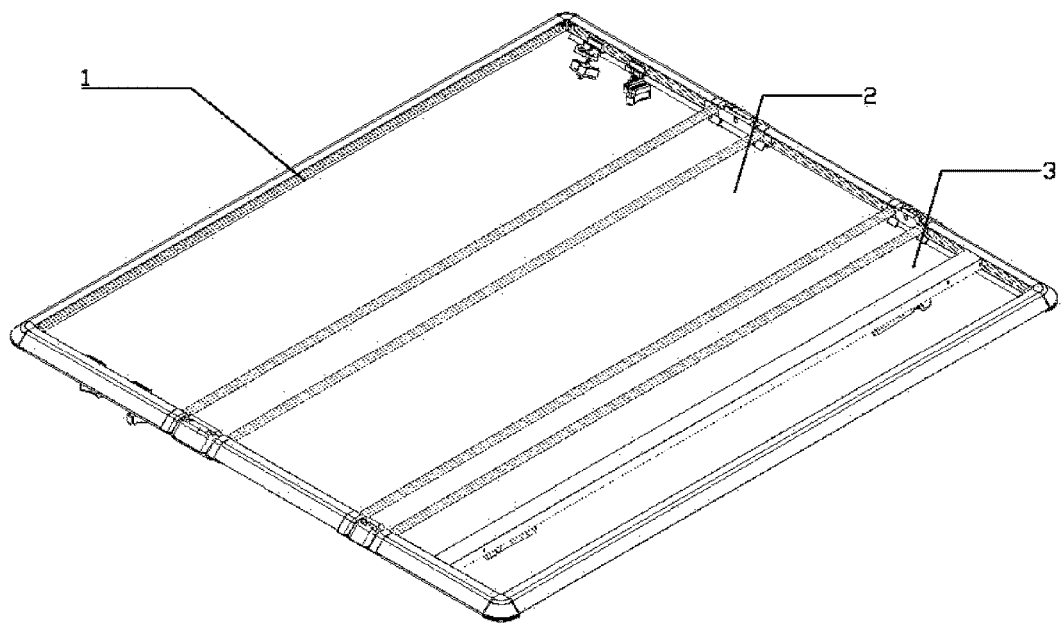
FIG. 3 is the illustration of its frame structure.
Figure 4:
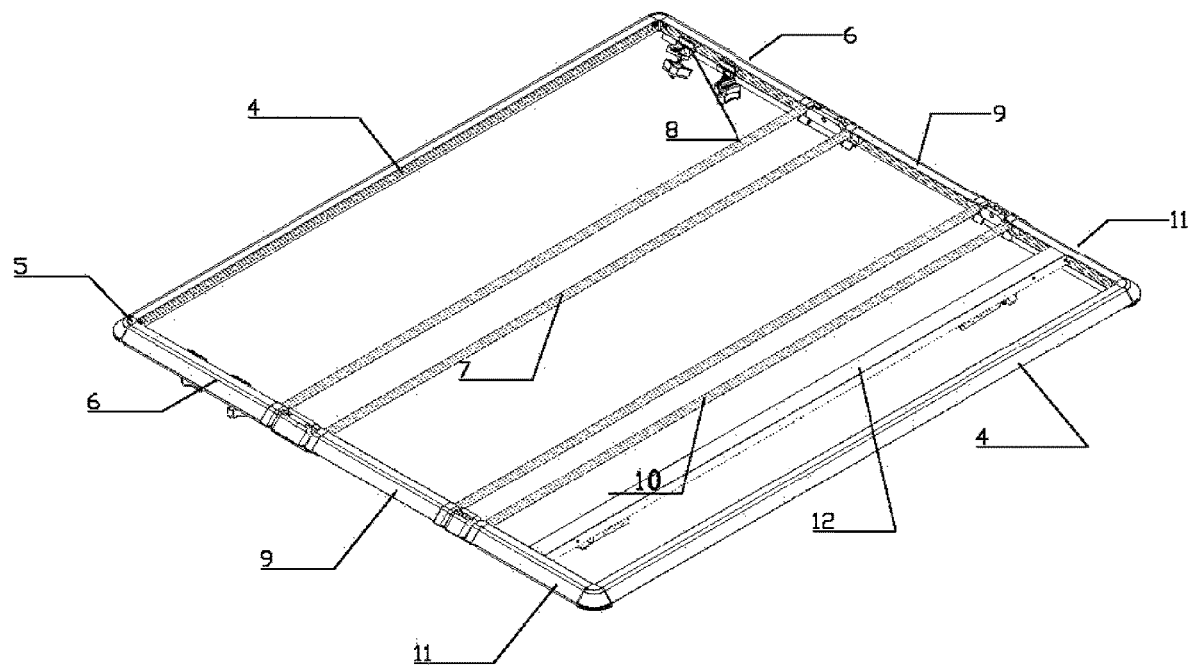
FIG. 4 is the details of its frame structure.
Figure 5:
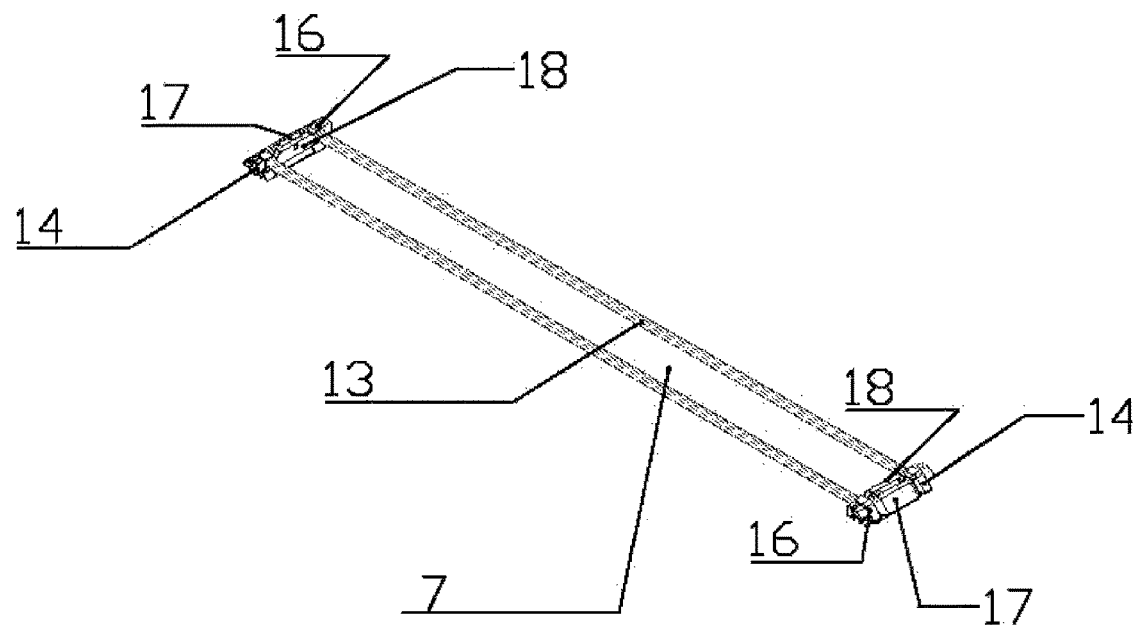
FIG. 5 is the illustration of its large rotating shaft system.
Figure 6:
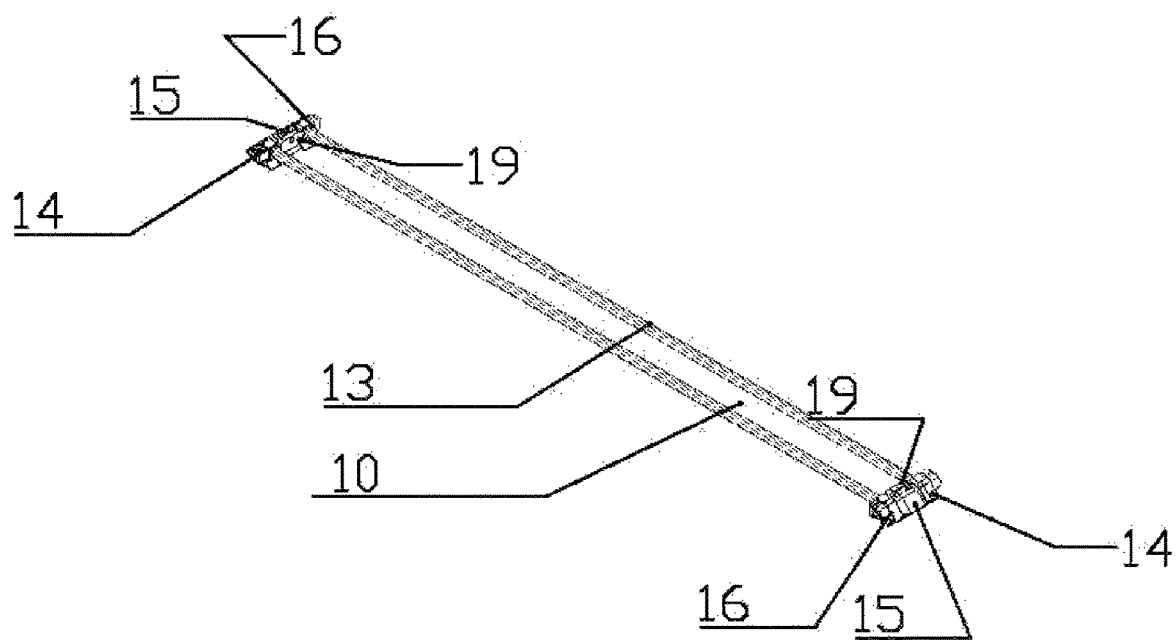
FIG. 6 is the illustration of its small rotating shaft system.
Figure 7:
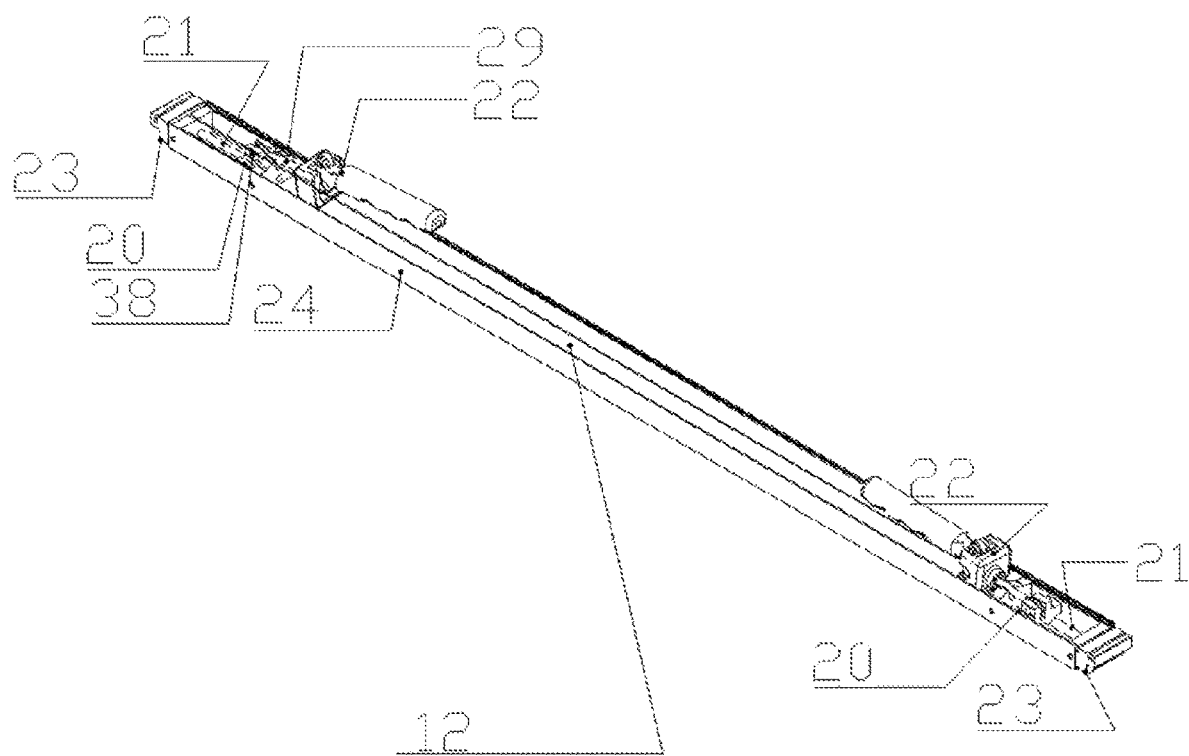
FIG. 7 is the illustration of its stiffener system.
Figure 8:
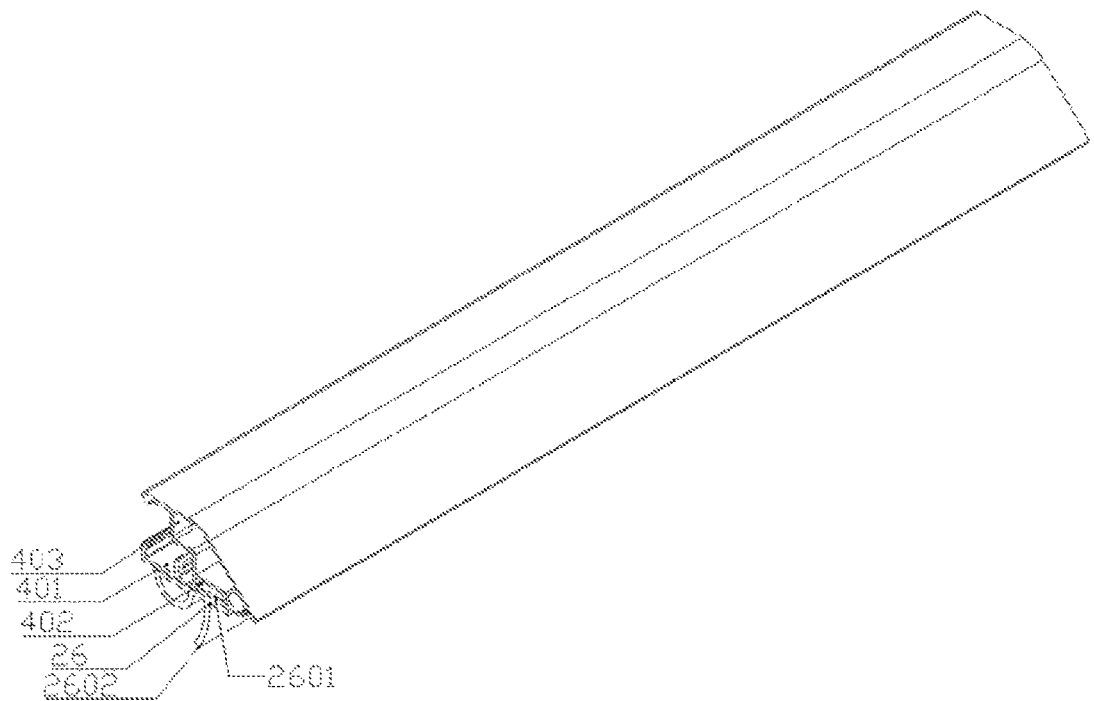
FIG. 8 is the illustration of its waterproof tape system.
Figures 1, 9:
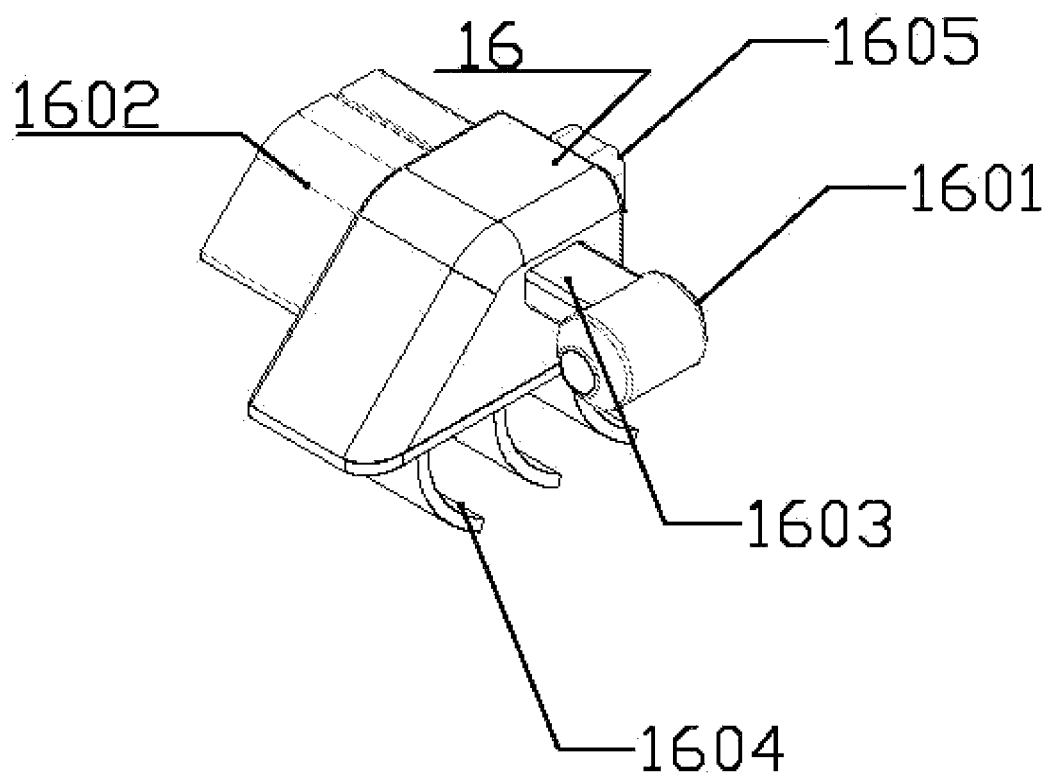
Figures 2, 9:
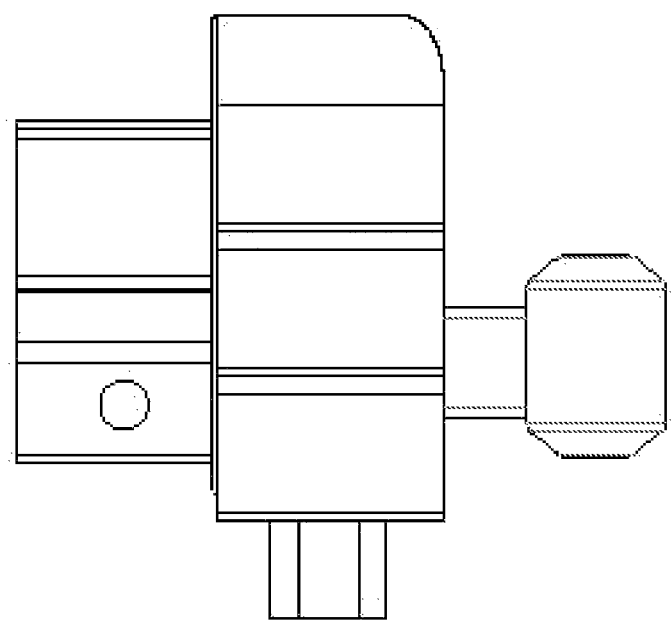
Figures 3, 9:
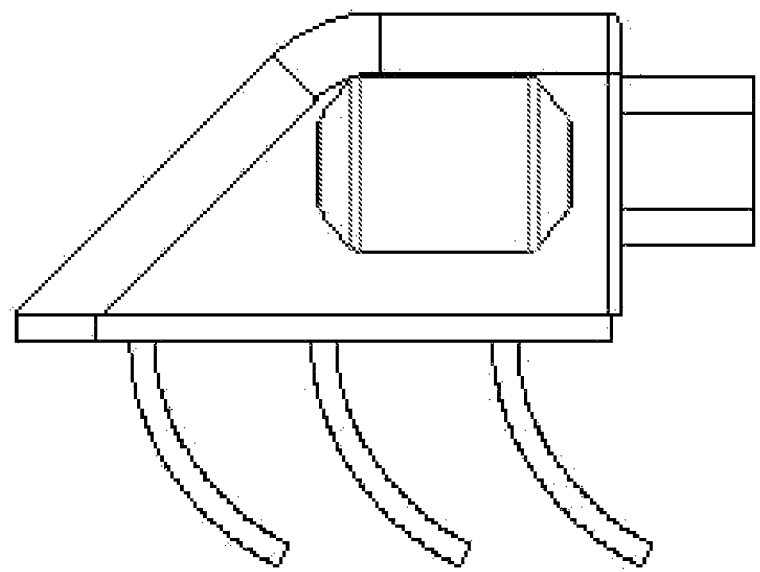
Figures 4, 9:
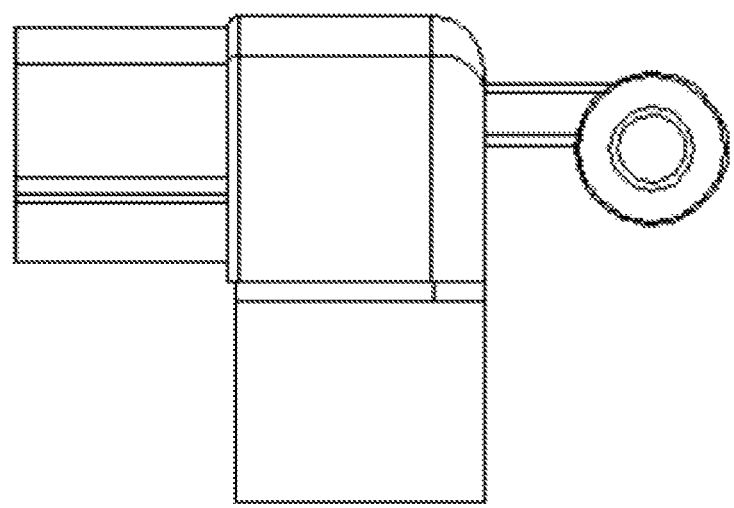
Figures 1, 10:
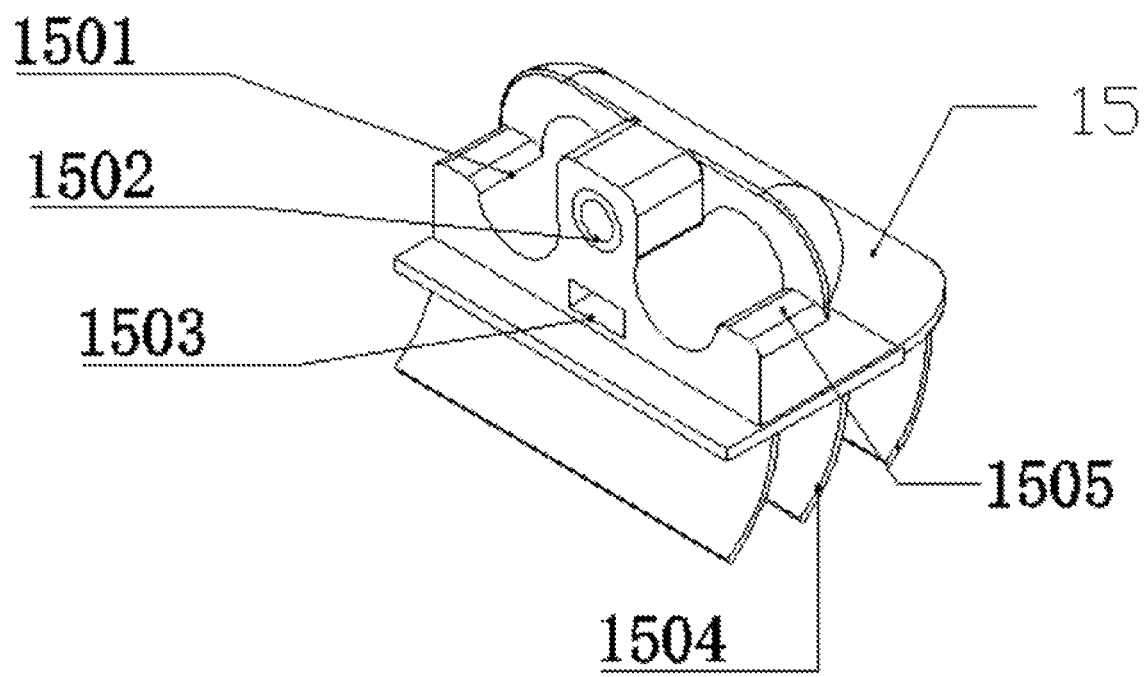
Figures 2, 10:
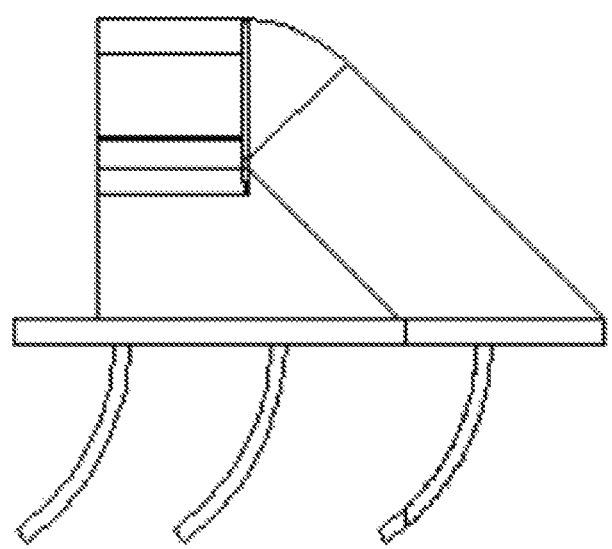
Figures 3, 10:
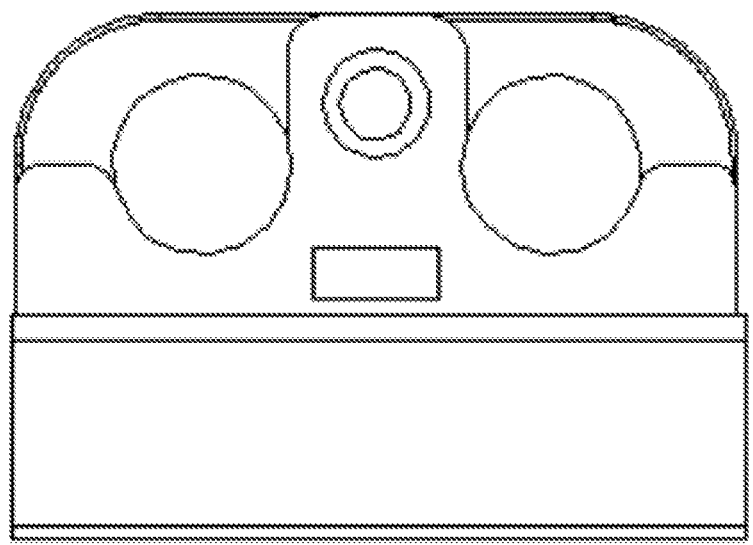
Figures 4, 10:
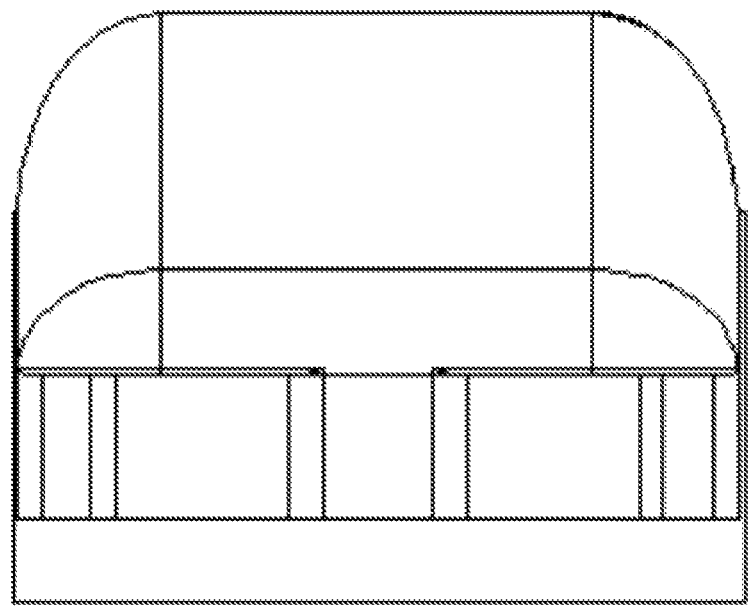
Figures 1, 11:
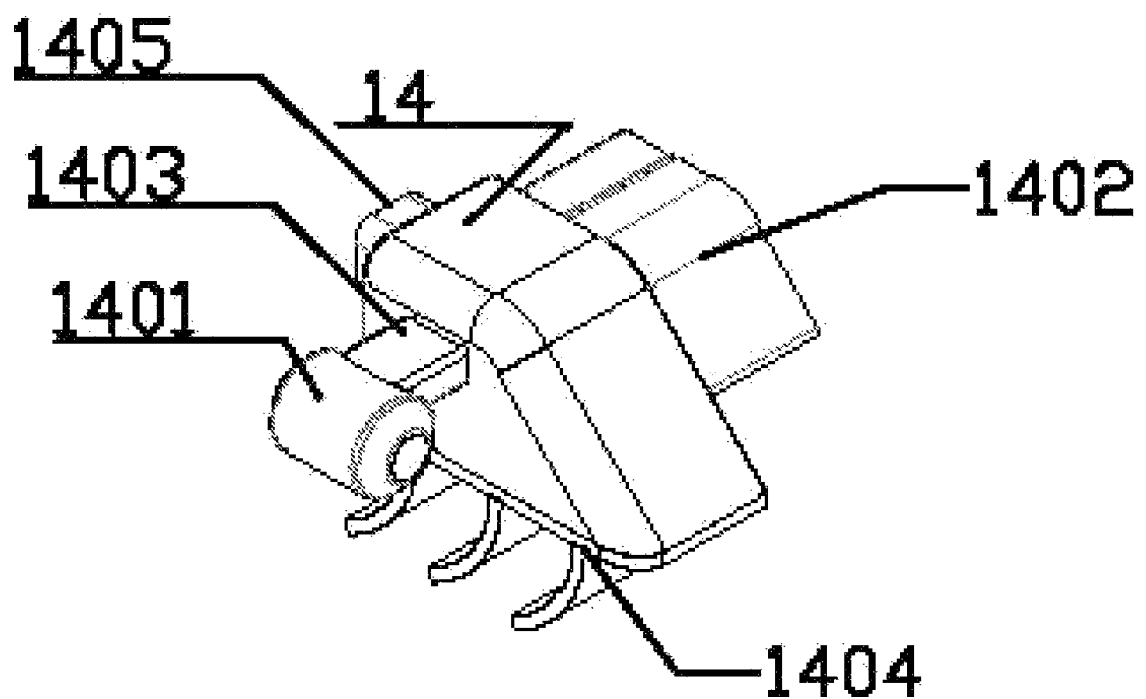
Figures 2, 11:
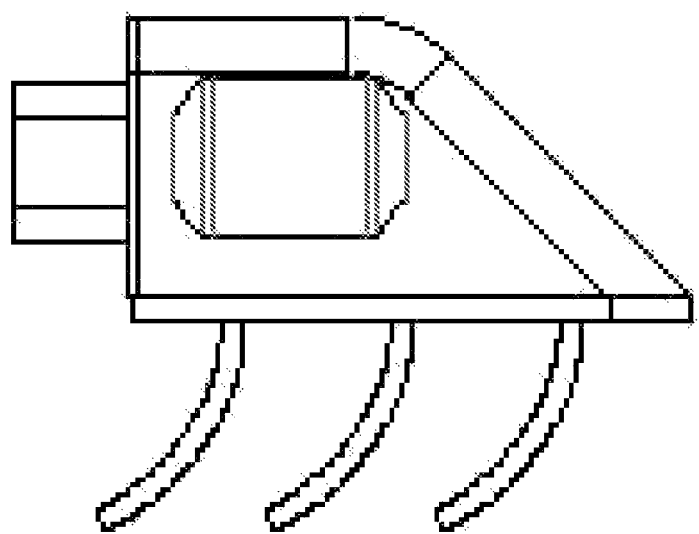
Figures 3, 11:
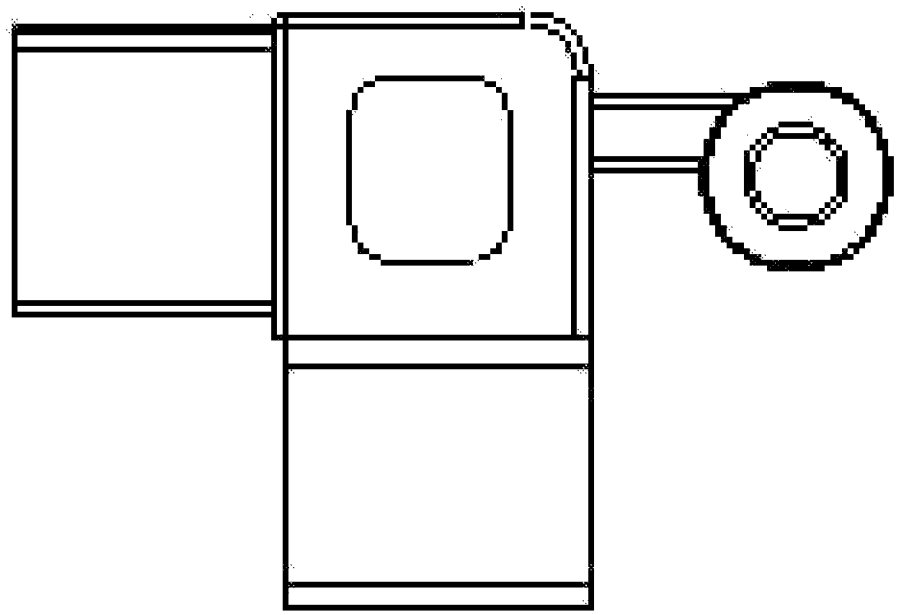
Figures 4, 11:
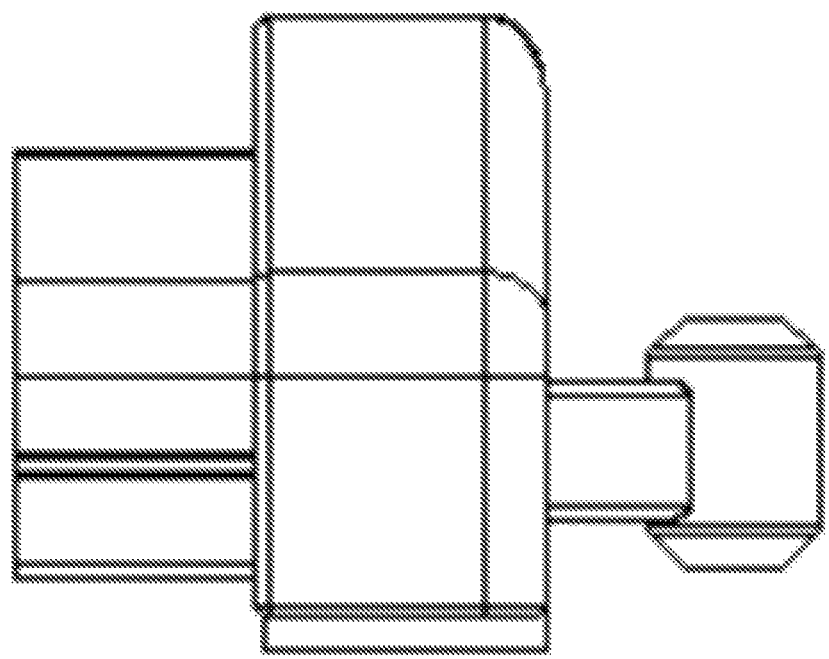
Figures 1, 12:
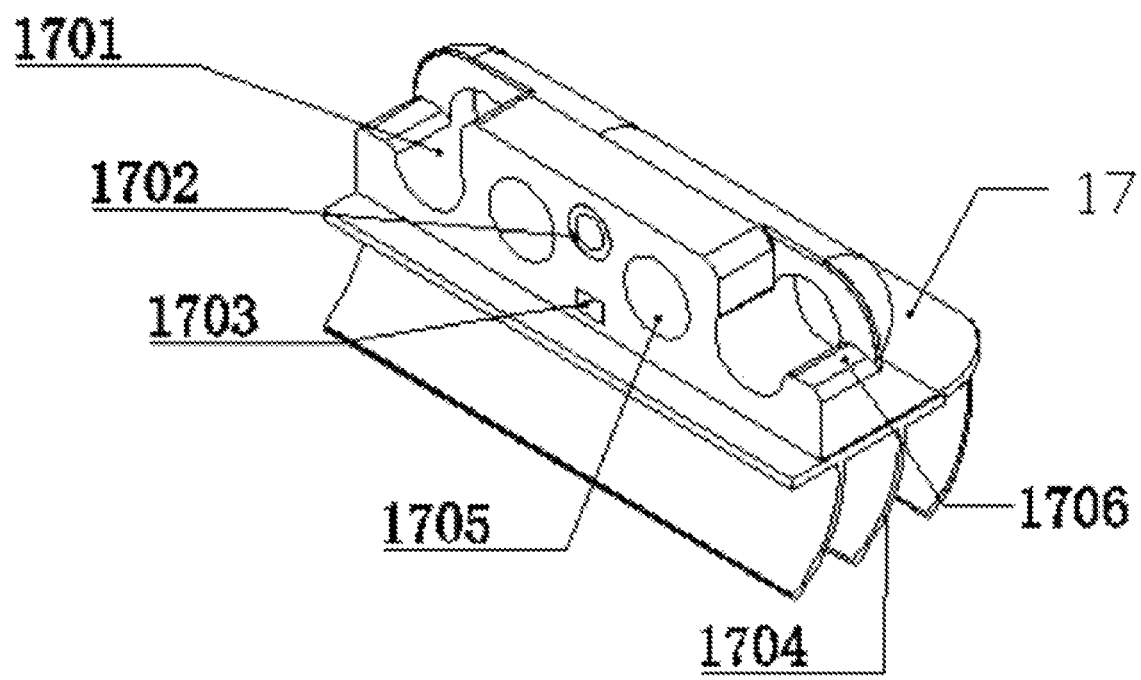
Figures 2, 12:
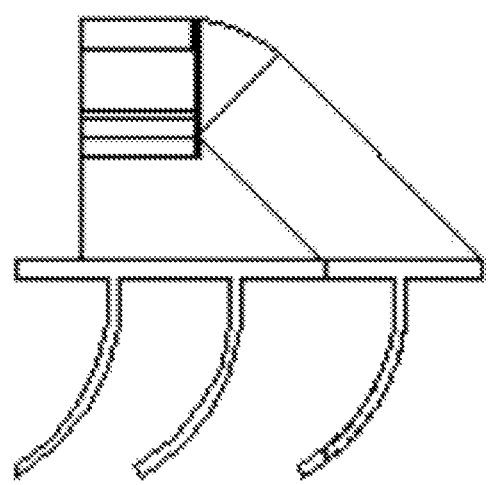
Figures 3, 12:
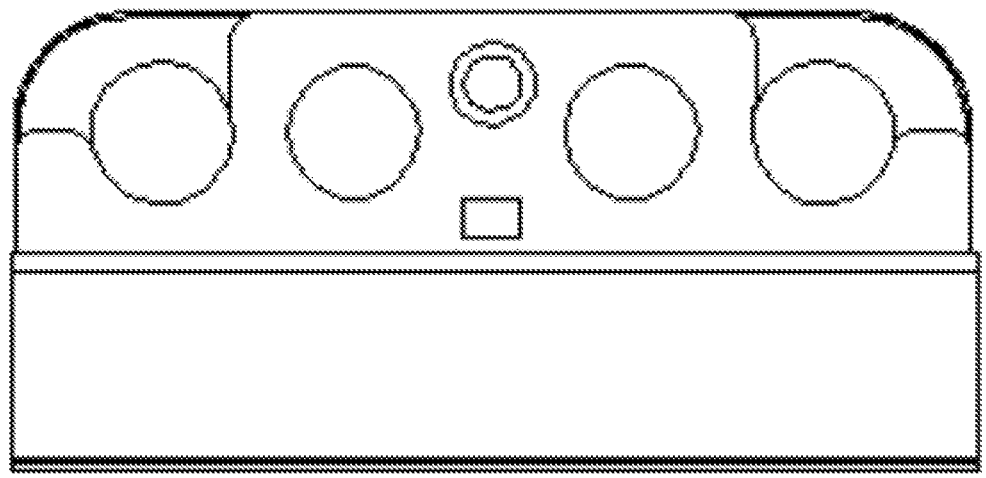
Figures 4, 12:
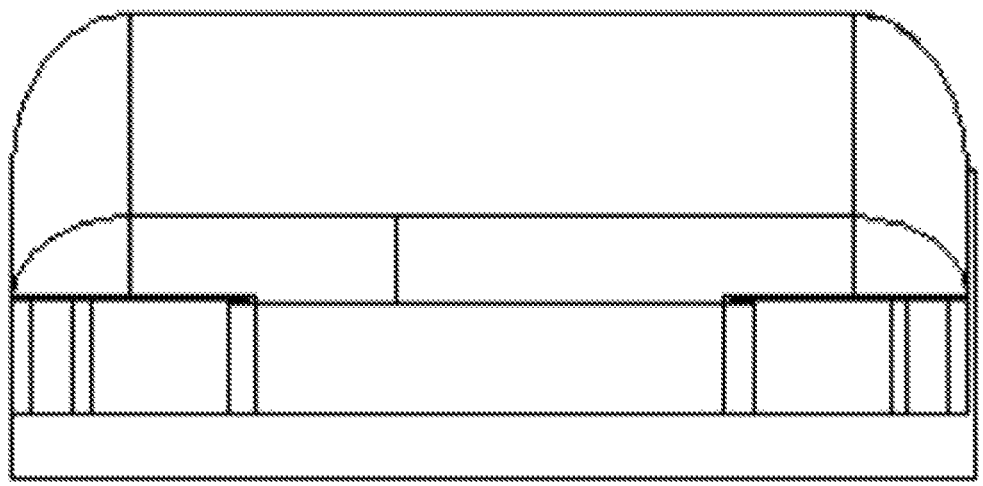
Figures 1, 13:
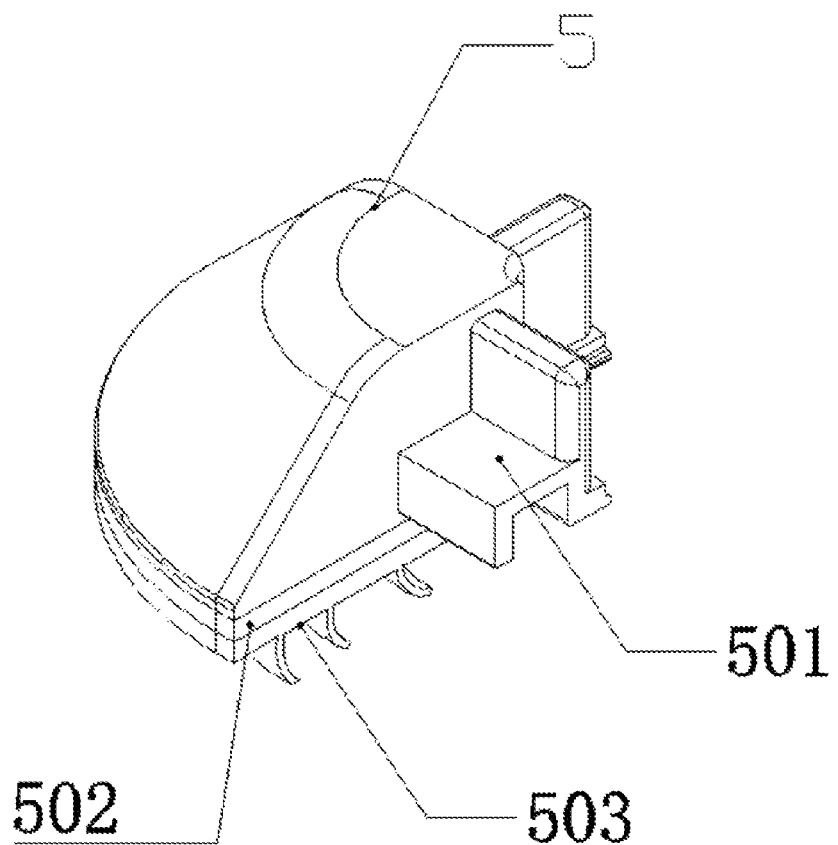
Figures 2, 13:
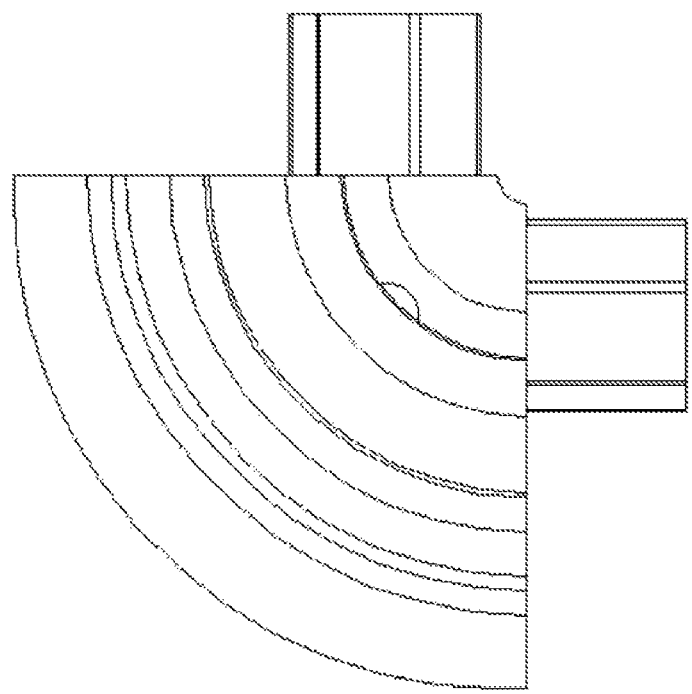
Figures 3, 13:
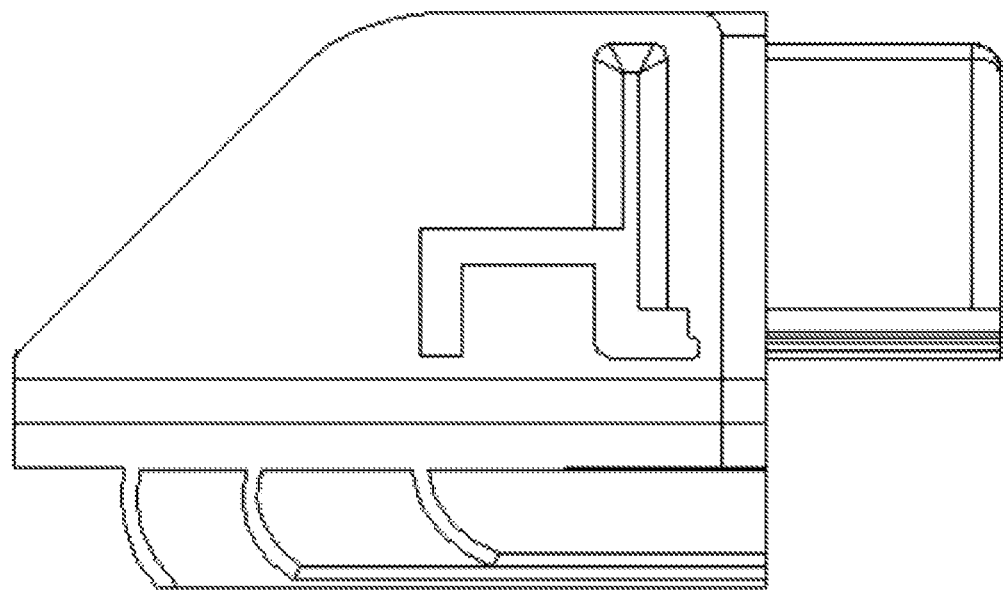
Figures 4, 13:
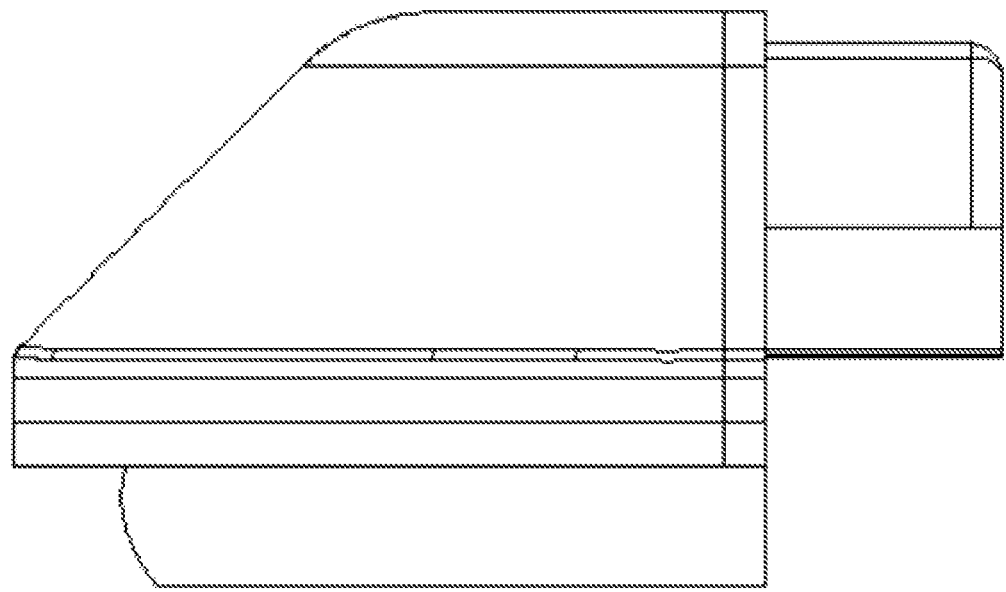
Figure 14:
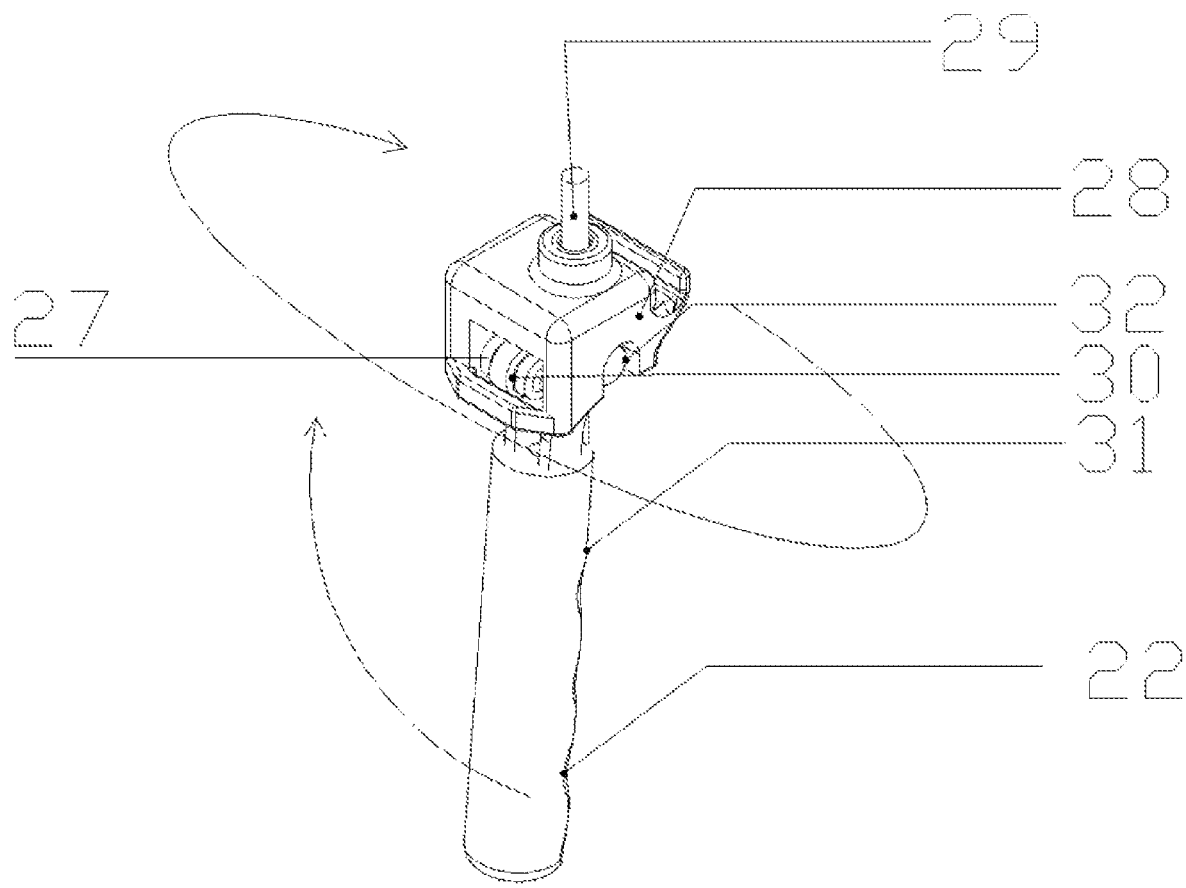
FIG. 14 is the illustration of its wrench.
Figures 1, 15:
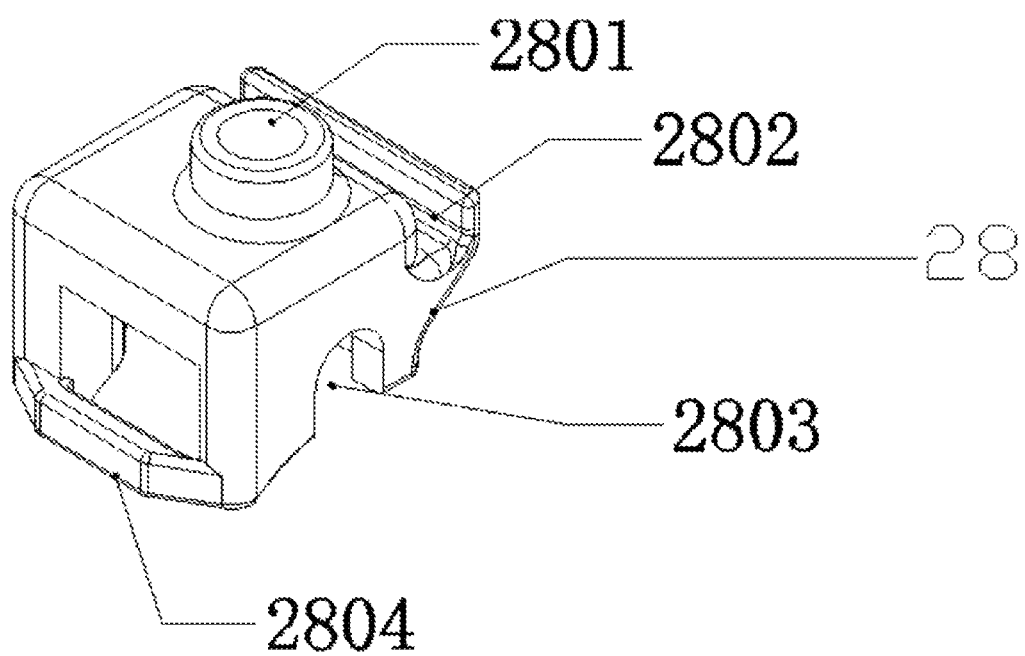
Figures 2, 15:
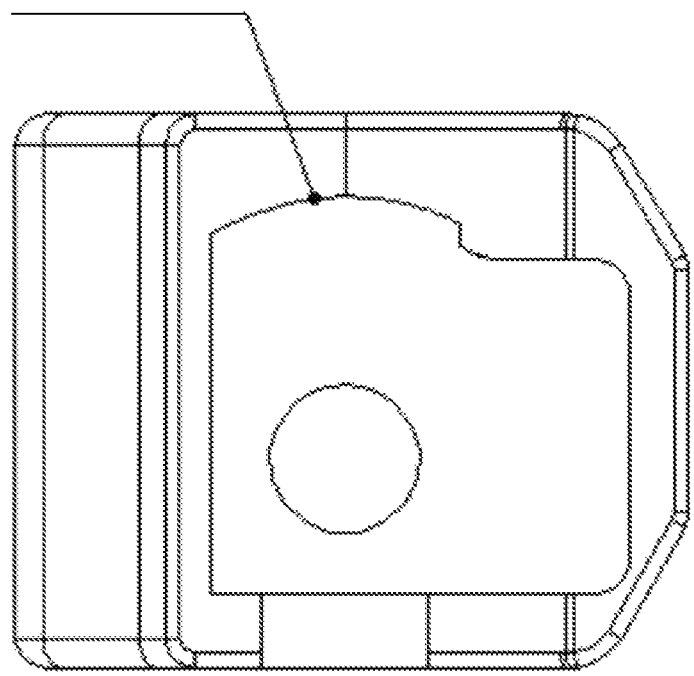
Figures 3, 15:
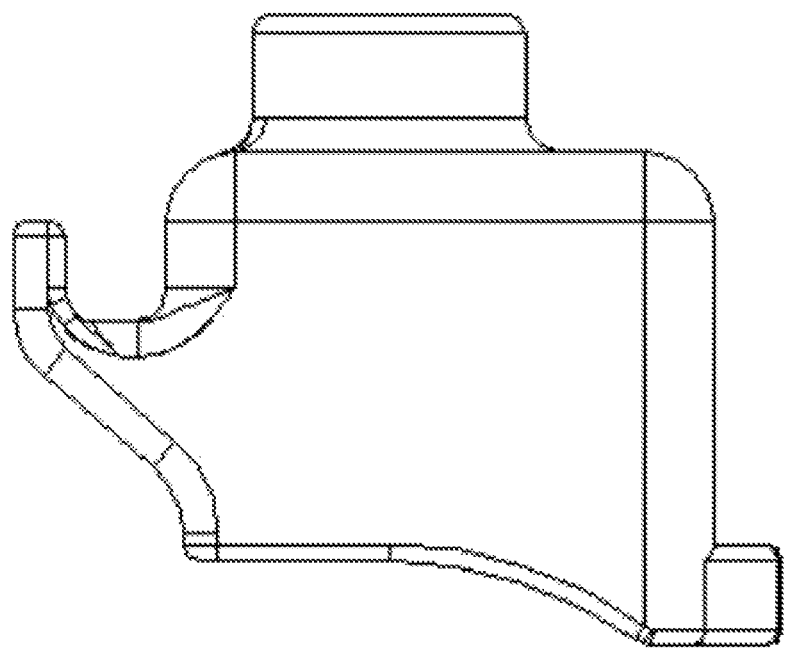
Figures 4, 15:
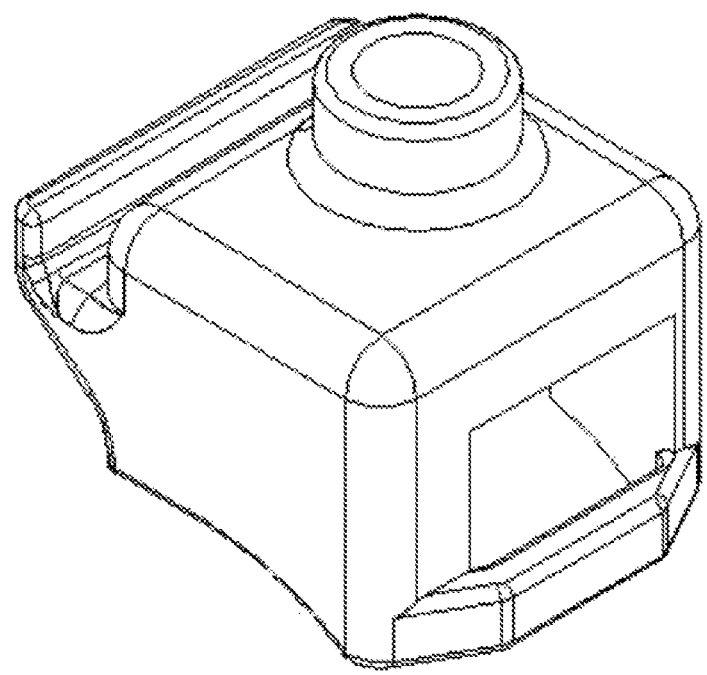
Figure 16:
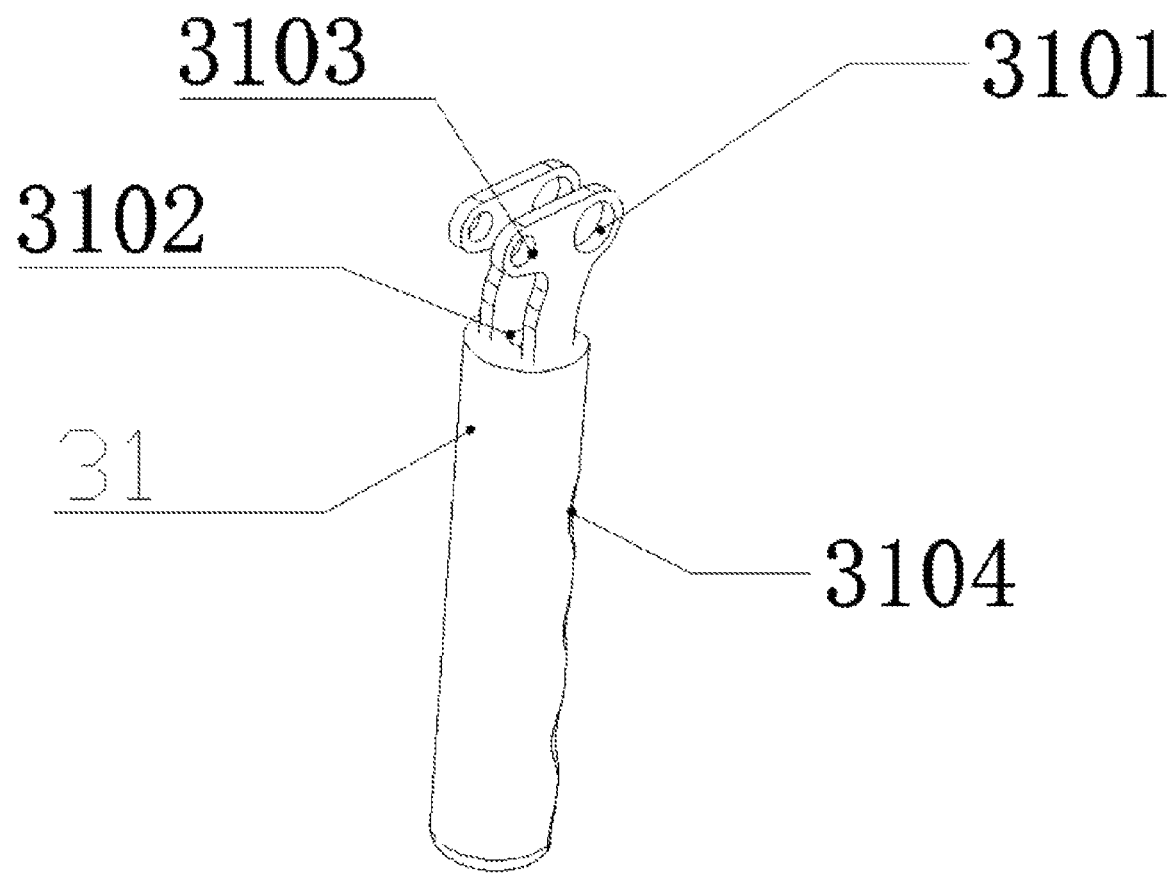
FIG. 16 is the illustration of its handle component.
Figure 17:
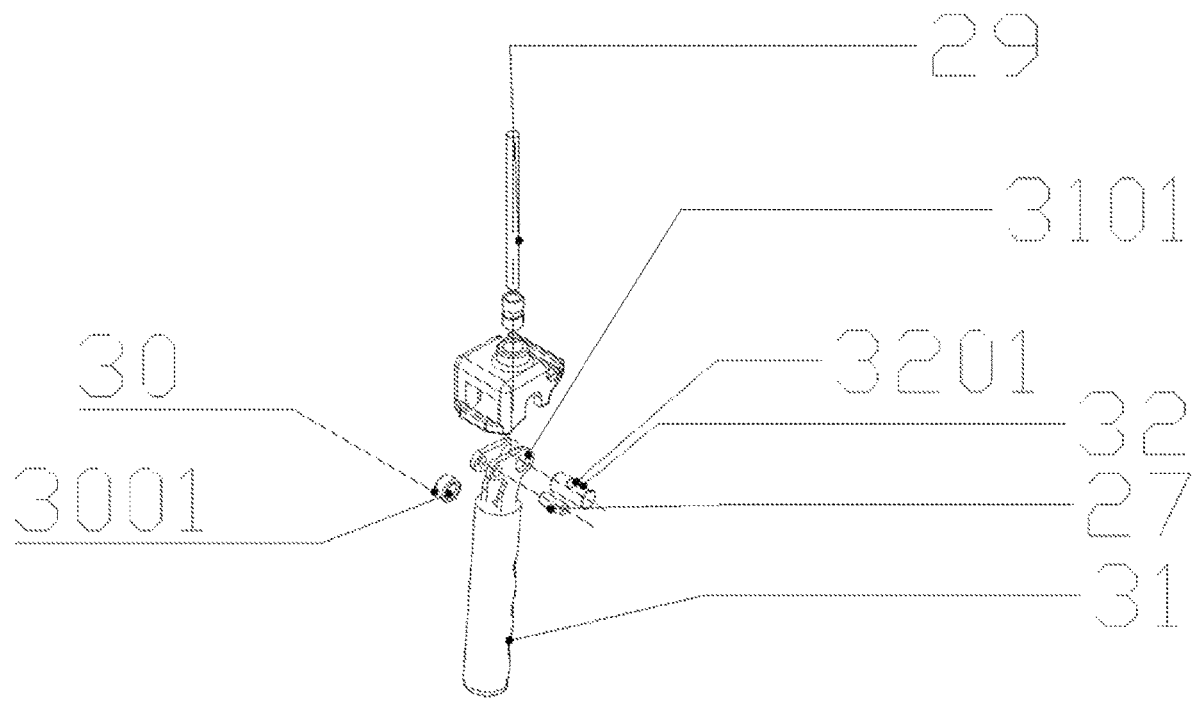
FIG. 17 is the exploded view of its wrench.
Figures 1, 18:
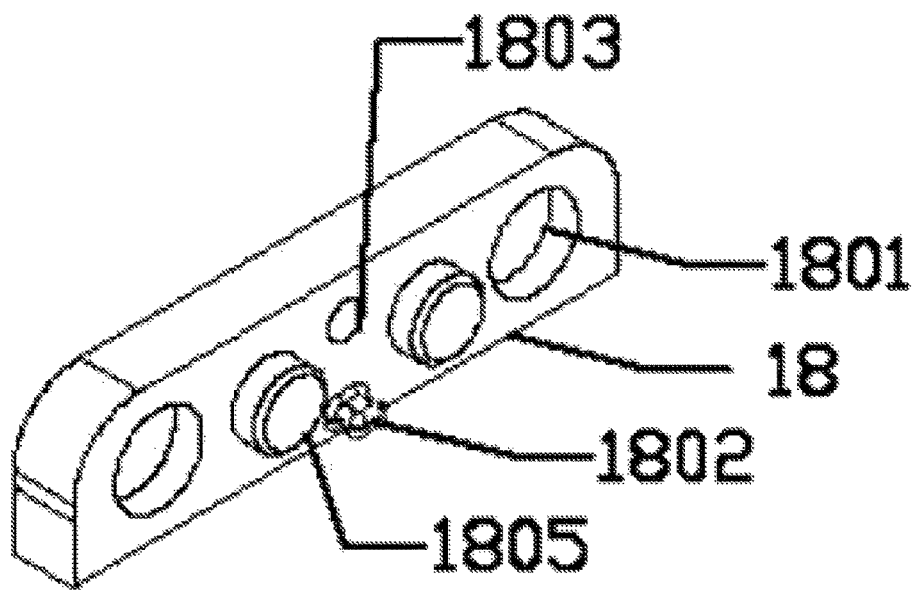
Figures 2, 18:
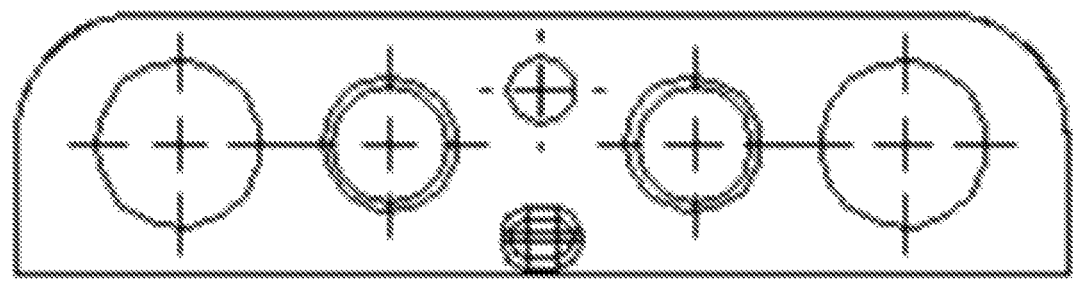
Figures 3, 18:
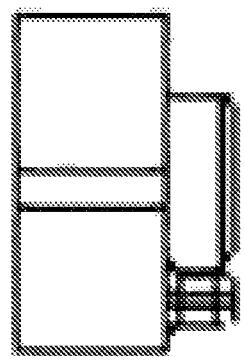
Figures 4, 18:
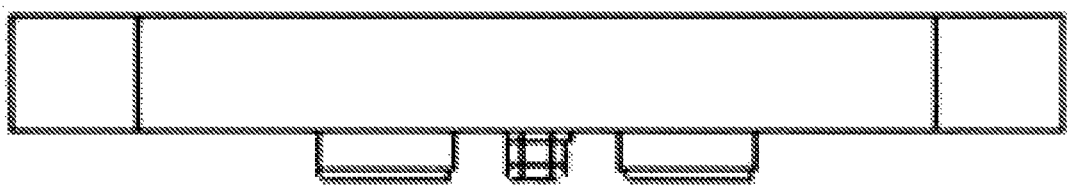
Figures 1, 19:
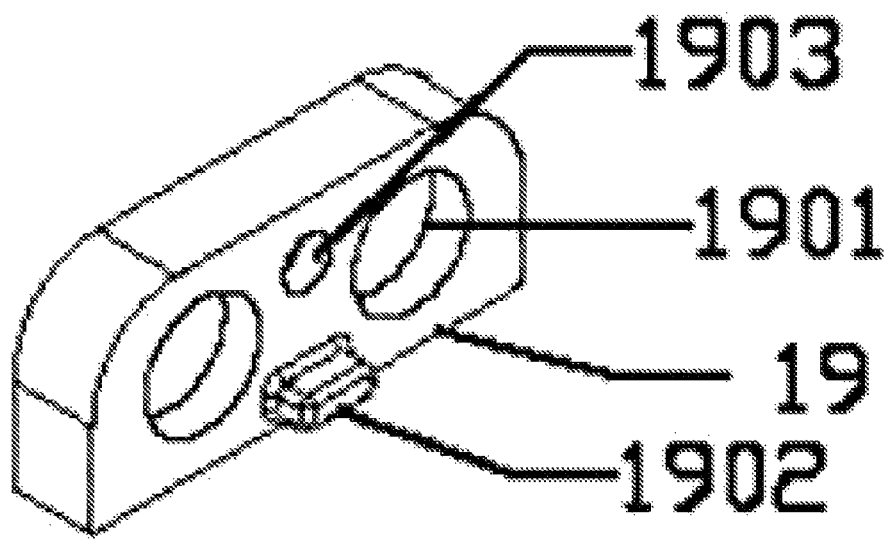
Figures 2, 19:
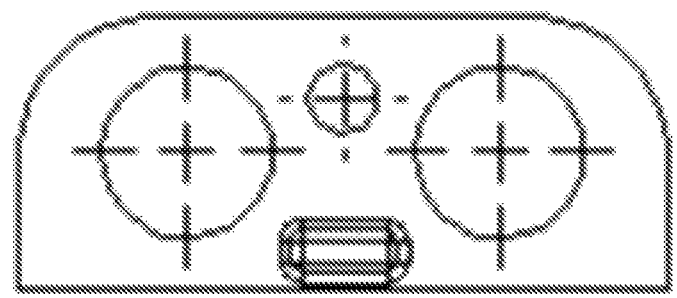
Figures 3, 19:
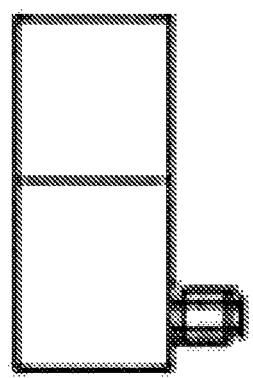
Figures 4, 19:
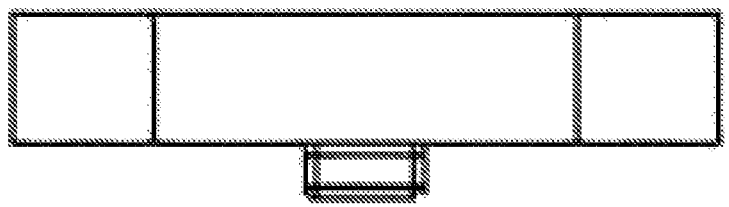
Figures 1, 20:
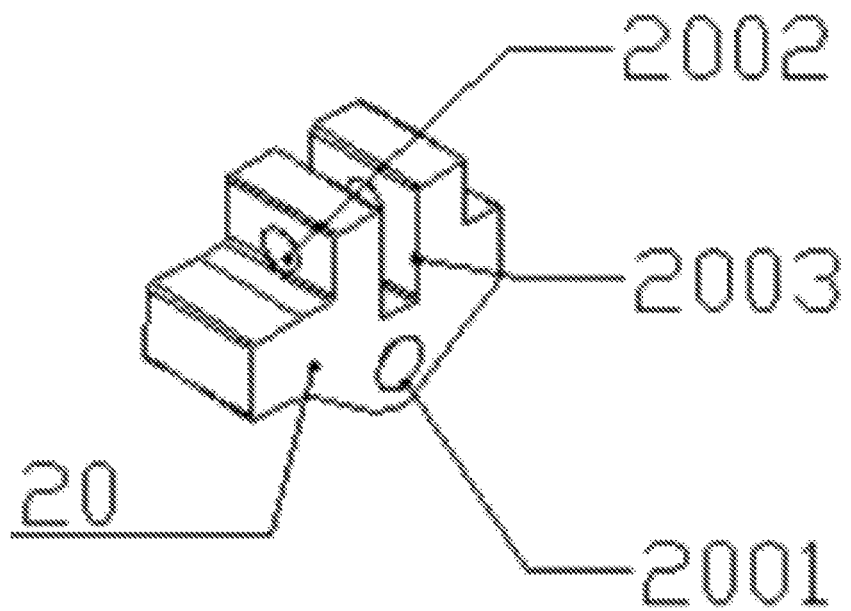
Figures 2, 20:
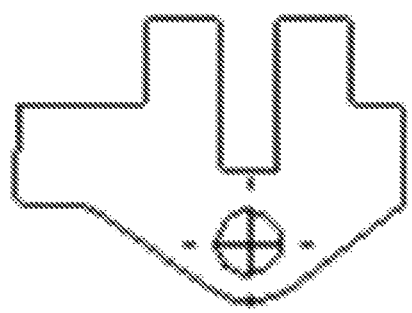
Figures 3, 20:
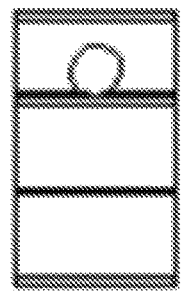
Figures 1, 21:
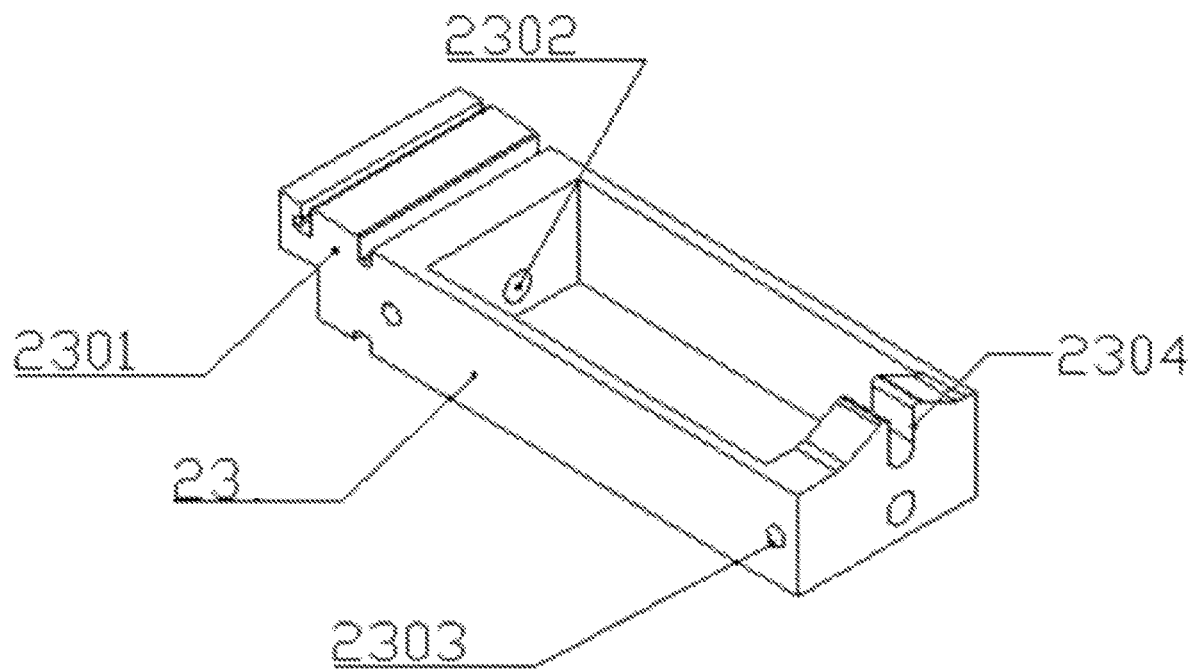
Figures 2, 21:
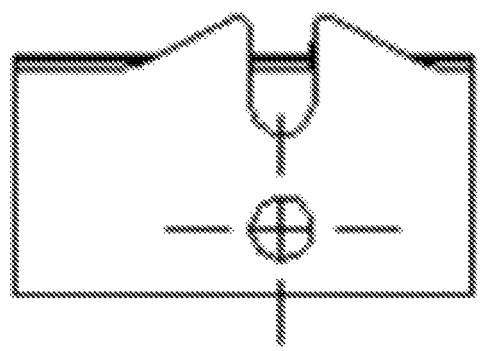
Figures 3, 21:
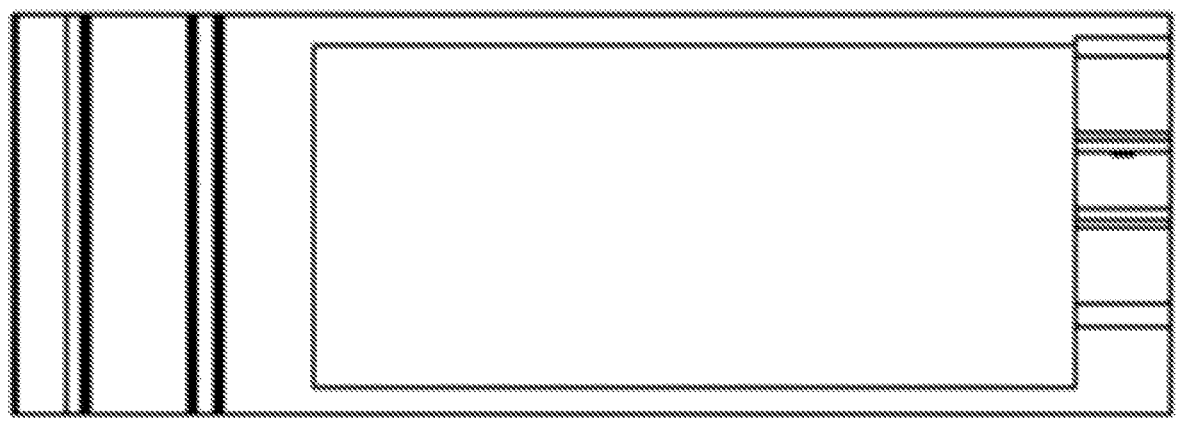
Figures 4, 21:
Figure 22:
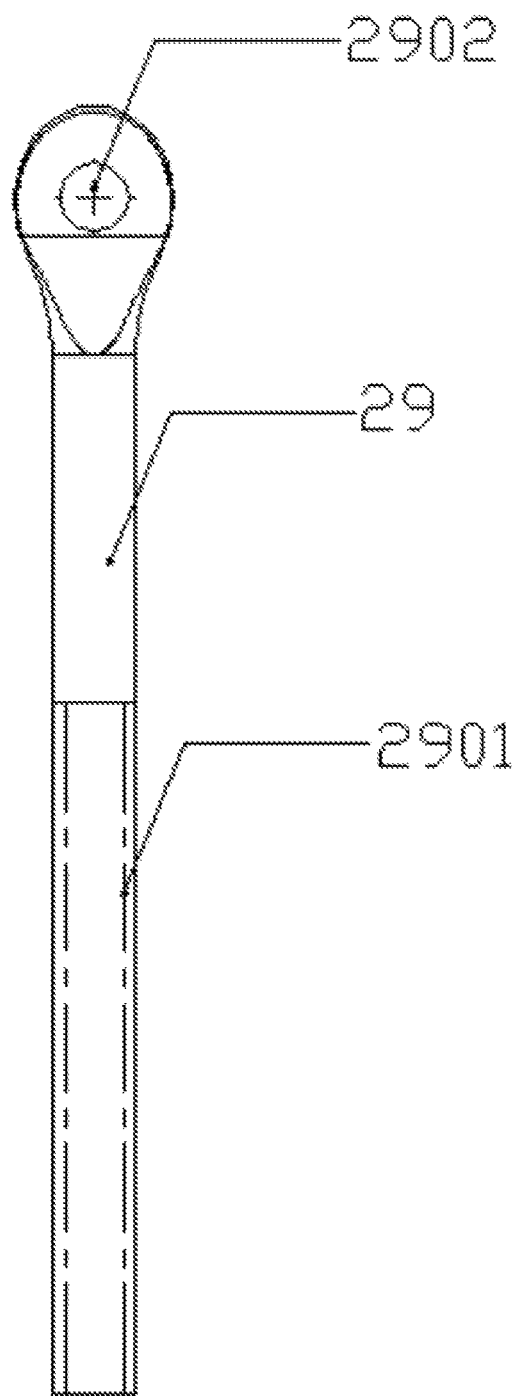
FIG. 22 is the illustration of its flat head thread rod.
Figure 23:
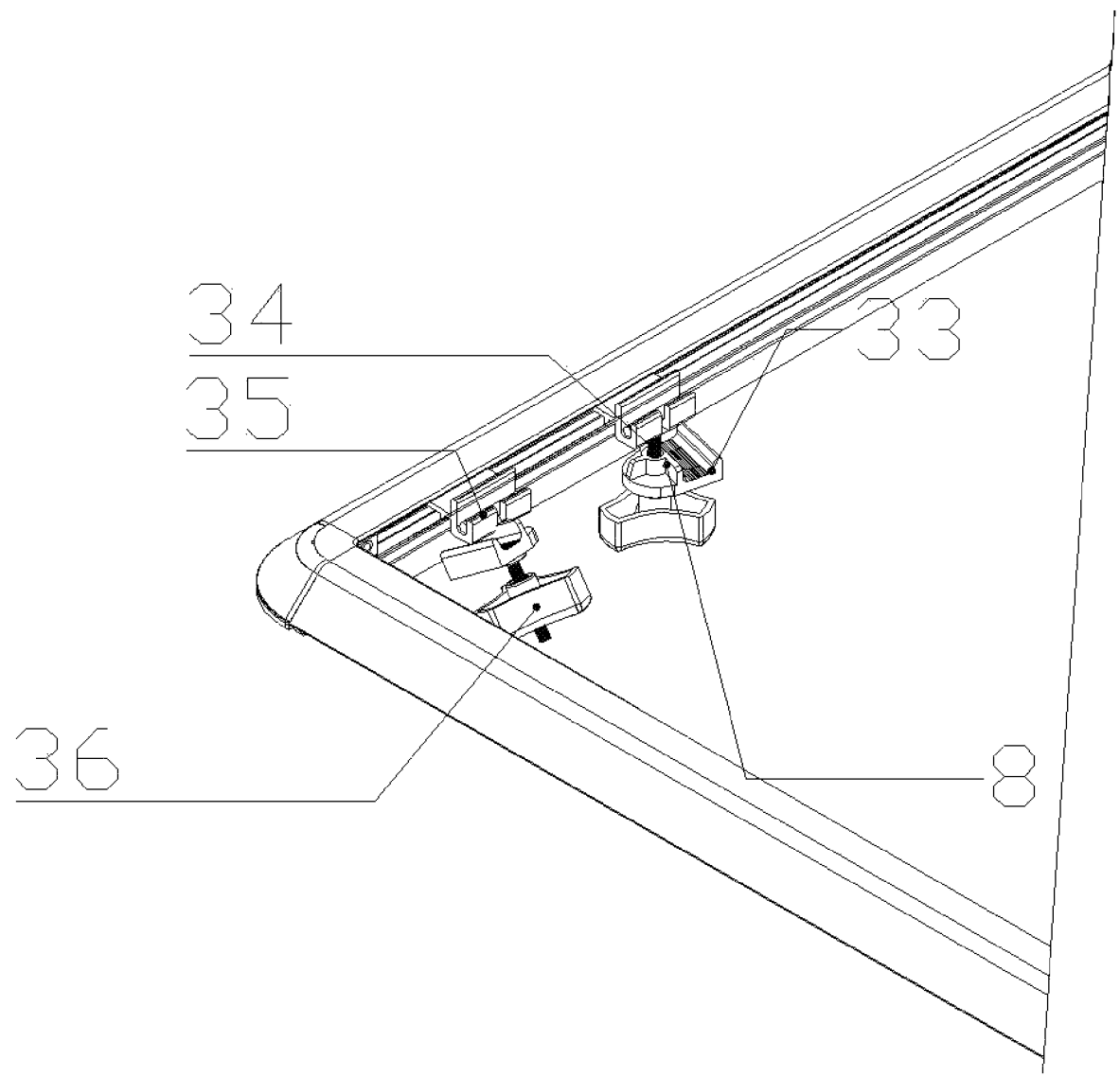
FIG. 23 is the illustration of its fixed buckle structure.

You can refer to FIGS. 1-23 and know that the bed cover of the pick-up truck provided by the example includes the frame structure 25 and the skin 37 covering the frame structure 25.

Frame structure 25 contains the first rectangular frame 1, the second rectangular frame 2 and the third rectangular frame.

The first rectangular frame 1 is composed of two first left and right bar 6, one front and back bar 4, a large rotating shaft system 7, two corner joints 5 and four sets of fixed buckle structure 8. The specific connection mode is that the corner joint 5 is provided with plug 501. with which inserts the socket part of the cavity 401 of the first left and right bar 6 as well as the front and back bar 4. Two first left and right bar 6 also has a socket 403, which is connected with the left joint plug 1402 set on the left joint 14 of the large shaft system 7 and the right joint plug 1602 set on the right joint 16. The fixed buckle structure 8 contains a T-shaped rod 34, the triangle nut 36 connected to the lower part of the T-shaped rod 34, the fixing upper clip 35 connected with the upper part of the rod 34, the fixed buckle 8 between the nut 36 and the clip 35 meanwhile connected to the rod 34. The fixed buckle structure 8 can slide in the cavity 401 on the first left and right bar 6 through the clip 35. Preferably, the fixed clip 33 and the fixed upper clip 35 are aluminum, and the T-shaped rod 34 is stainless steel.

The second rectangular frame 2 consists of two second left and right bar 9, a large rotating shaft system 7 and a small rotating shaft system 10. The specific connection way is that two second left and right bar is connected with the plug 1402 on the left joint 14 of the large rotating shaft system 7 on the left joint and the plug 1602 on the right joint 16 through the bar socket 403, and can also connect with the plug 1402 on the left joint 14 of the small rotating shaft system 10 as well as the plug 1602 on the joint right joint 16.

The third rectangular frame 3 consists of two third left and right bar 11, a small rotating shaft system 10, a front and back bar 4, a stiffener system 12 and a corner joint 5. The concrete connection mode is that the corner joint plug 5 on the corner joint 501 inserts the cavities socket part 401 of the left and right sidebar 11 and the front and back sidebar 4. two first left and right bar is connected with the plug 1402 on the left joint 14 of the small rotating shaft system 10 on the left joint and the plug 1602 on the right joint 16 through the bar socket 403. The stiffener system 12 realizes sliding connection into the cavity 401 of the third left and right bar 11 through the fixed block part 2301 on its upper bar sliding fixed block 23.

The stiffener system 12 is composed of two bars bar sliding fixed blocks 23, two wrench sliding blocks 20, two wrench sliding rods 21, wrench 22, two flat head threaded rods 29 and a stiffener 24; the wrench 22 is fixed in stiffener 24. The role of the stiffener 24 is to strengthen the whole bed cover of the pick-up truck at first, then the wrench 22 can be put into stiffener 24 to be fixed. The specific implementation plan is that spanner 22 is connected to the thread section 2901 on the flat head thread rod 29 through the wrench thread insert 2801 on its upper supporting shell 28, thus the wrench 22 can slide in the stiffener 24 through the flat head thread rod 29 in the reinforcing rod 24. The wrench thread insert 2801 is preferred for copper. The short shaft 38 passes through the flat head hole 2902 on the flat head threaded rod 29 to fix the wrench 22 on the wrench slide block 20. The transverse hole 2001 on the wrench slide block 20 are connected to the wrench slide rod 21 to enable the wrench 22 to move on the sliding rod 21. The two ends of the wrench slide rod 21 are fixed with the sliding rod fixing holes 2302 at the two inside ends of the bar sliding block 23. The wrench 22 is clamped into the slotted-hole-shape groove 2304 of the bar sliding fixed block by the flat head screw rod 29 and is fixed in the stiffener 24. The lower part of the bar sliding block 23 is provided with riveting fixing holes 2303 through both sides. The block is riveted and fixed on the stiffener 24 through the hole 2303.

The large rotating shaft system 7 is made up of two left joints 14, two right joints 16, two large middle joint 17 and a middle rod 13. The middle rod 13 is provided with a parallel double bar structure, and the two rods are provided with a square cavity. The left joint 14 is provided with a left joint fixing part. One side of fixing part near the middle joint is provided with a convex rotating shaft part 1401, and the shaft part is connected to the fixing part by the rotating shaft connecting arm of left joint 1403. The other side of the left joint fixing part is provided with a plug 1402 and a gasket 1404 is fixed below the left joint fixing part, and the vertical end face of the left joint fixing part is provided with a square convex of the left joint 1405. The right joint 16 is provided with fixing part, rotating shaft part 1601, rotating shaft connection arm 1603, plug 1602, gasket 1604 and the square convex 1605. The fixing part of the left joint and the right joint are hollow inside. The front of the large middle joint 17 is a vertical wall, and the back is a hollow shell. The two sides of the large middle joint 17 are respectively provided with the first circular groove 1701. There are two symmetrical circular holes 1705 on the vertical wall of the large middle joint 17 between the two first circular grooves 1701. The lower part of the vertical wall between the two circular holes 1705 is provided with a first rectangular hole 1703. The upper part of the vertical wall above the first rectangular hole 1703 is provided with a convex first thread insert 1702 between the two circular holes 1705. The top of the vertical wall of the large middle joint 17 between the two first circular grooves 1701 is provided with a rectangular top surface perpendicular to the vertical wall. A rectangular facade is arranged between the inner edge of the two first circular groove 1701 and the rectangular top surface of the vertical wall. The top of the edge of the two first round grooves on the 1701 side is provided with a rectangular first limit surface 1706 perpendicular to the vertical wall. A large middle joint gasket 1704 is provided below the large middle joint 17. The large middle joint 17 and the large joint fixed plate 18 are fixed. The material of the large joint fixed plate 18 is preferred to be plastic. One side of the large joint fixed plate 18 is provided with two cylindrical convexes 1805. The lower part of the side of the large joint fixed plate between the two cylindrical protrusions 1805 is provided with a first rectangular convex 1802. A first hole 1803 is provided on the side of the large joint fixed plate 18 above the first rectangular convex 1802 between the two cylindrical protrusions 1805. The outer side of the two cylindrical convex 1805 is also provided with a first round hole 1801 that runs through the both sides of the large joint fixed plate 18. The large joint fixed plate 18 is symmetrical to the middle line vertical to the length direction of it.

The concrete mode of connection is: The left joint 14 and the first circular groove 1701 of the large middle joint 17 are coaxially assembled to form a rotating shaft by the left joint rotating shaft part 1401. Similarly, the right joint 16 and the first circular groove 1701 of the large middle joint 17 are coaxially assembled to form a rotating shaft. The left joint rotating shaft connection arm 1403 on the left joint 14 and the right joint rotating shaft connection arm 1603 on the right joint 16 collide with the first rectangular limiting face 1706 on the large middle joint 17 when rotating to play the role of limiting. The large middle joint 17 is connected with the first rectangle convex 1802 and the cylindrical convex 1805 on the large joint fixing plate 18 by the first rectangle hole 1703 and the circular hole 1705 to form a limit. The large middle joint 17 and the first hole 1803 on the fixing plate 18 are coaxially assembled by the first thread insert 1702 and tightened by screw, thus the left joint 14 and the right joint 16 can be locked in the first circular groove 1701 structure of the large middle joint 17 and the first circular hole 1801 structure in the large joint fixed plate 18. The two ends of one bar of the double bar in the middle bar 13 are respectively fixed with the left joint 14 on both sides, and the two ends of the other bar are fixed with the right joint 16 on both sides; The square convex 1405 of the left joint is inserted into the square cavity of one of the double bars in the middle bar from both ends, and the square convex of the right joint 1605 is inserted into the square cavity of one of the double bars in the middle bar 13 from both ends. Thus the whole large rotating shaft system 7 is fixed. The first square convex 1804 structure on the large joint fixed plate 18 is inserted into the cavity of the middle rod 13 to fix the whole large rotating shaft system 7. The large middle joint gasket 1704, the left joint gasket 1404 and the right joint gasket 1604 are all shark fin waterproof structure which can multiple waterproof function.

The small rotating shaft system 7 is made up of two left joints 14, two right joints 16, two small middle joint 15 and a middle rod 13.

The middle rod 13, and the left joint 14 and the right joint 16 is the same as those in the large rotating shaft system 7. The front of the small middle joint 15 is a vertical wall, and the back is a hollow shell. The two sides of the small middle joint 15 are respectively provided with the second circular groove 1501. There is the second convex thread insert 1502 on the vertical wall of the small middle joint 15 between the two second circular grooves 1501. A second rectangular hole 1503 is provided on the vertical wall of a small middle joint 15 in the lower part of the second thread insert 1502. The top of the vertical wall of the small middle joint 15 between the two second circular grooves 1501 is provided with a rectangular top surface perpendicular to the vertical wall. A rectangular facade is arranged between the inner edge of the two second circular groove 1501 and the rectangular top surface of the vertical wall. The top of the edge of the two first round grooves on the 1501 side is provided with a rectangular second limit surface 1505 perpendicular to the vertical wall. A small middle joint gasket 1504 is provided below the small middle joint 15. The small middle joint 15 and the small joint fixed plate 19 are fixed. The material of the small joint fixed plate 19 is preferred to be plastic. The lower part of one side of the small joint fixed plate 19 is provided with the second rectangular rectangular convex 1902. A second hole 1902 is provided on the side of the small joint fixed plate 19 above the second rectangular convex 1902. The outer side of the second hole 1903 is also provided with a second round hole 1901 that runs through the both sides of the small joint fixed plate 19. The small joint fixed plate 19 is symmetrical to the middle line vertical to the length direction of it.

The concrete mode of connection is: The left joint 14 and the second circular groove 1501 of the small middle joint 15 are coaxially assembled to form a rotating shaft by the left joint rotating shaft part 140. Similarly, the right joint 16 and the second circular groove 1501 of the small middle joint 15 are coaxially assembled to form a rotating shaft. The left joint rotating shaft connection arm 1403 on the left joint 14 and the right joint rotating shaft connection arm 1603 on the right joint 16 collide with the second limiting face 1505 on the small middle joint 15 when rotating to play the role of limiting. The small middle joint 15 is connected with the second rectangle convex 1902 on the small joint fixing plate 19 by the second rectangle hole 1503 to form a limit. The small middle joint 15 and the second hole 1903 on the fixing plate 19 are coaxially assembled by the second thread insert 15702 and tightened by screw, thus the left joint 14 and the right joint 16 can be locked in the second circular groove 1501 structure of the small middle joint 15 and the second circular hole 1901 structure in the small joint fixed plate 19. The two ends of one bar of the double bar in the middle bar 13 are respectively fixed with the left joint 14 on both sides, and the two ends of the other bar are fixed with the right joint 16 on both sides; The square convex 1405 of the left joint is inserted into the square cavity of one of the double bars in the middle bar from both ends, and the square convex of the right joint 1605 is inserted into the square cavity of one of the double bars in the middle bar 13 from both ends. Thus the whole small rotating shaft system 10 is fixed. The second square convex 1904 structure on the small joint fixed plate 19 is inserted into the cavity of the middle rod 13 to fix the whole small rotating shaft system 10. The small middle joint gasket 1504, the left joint gasket 1404 and the right joint gasket 1604 are all shark fin waterproof structure which can multiple waterproof function.

The wrench 22 comprises a supporting shell 28, a wrench shaft 28, a roller 30, a handle component 31, and a cylindrical thread bolt 32. The specific implementation plan is to insert the cylindrical thread bolt 32 to the big hole 3101 on the handle component 31. The thread hole 3201 on the bolt 32 and the thread part 2901 on the flat head thread rod 29 will be engaged to fix the wrench 22 on the rod 29. When the small hole 3103 on the handle component 31 is inserted into the wrench rotating shaft 27 and shaft 27 is inserted into the position of roller hole 3001 on the roller 30, the roller 30 will be fixed on the handle component 31. The movement of the handle component 31 is that the rotation of the cylindrical thread bolt 32 drives the vertical movement of the handle component 31 in the supporting shell 28. And the component 31 is limited by flat gear lever 2804 on the supporting shell 28. The handle component 31 rotates in the supporting shell 28 through the roller 30, thus makes the handle component 31 be able to rotate 90 degrees in the support shell 28 to stick the wrench 22 on arc-shaped groove 2805 of the supporting shell 28. The wave structure 3104 is finger print to improve the comfort of holding the handle component 31. There is a iron rod inserted in the center hole 3102 to strengthen the handle component 31. Bar buckle 2802, concrete movement is that the rotation of the cylindrical thread bolt 32 drives the vertical movement of the handle component 31 in the supporting shell 28. When the roller 30 is against the upper surface of the cavity pocket 2803 in the supporting shell 28, the supporting shell 28 is driven to move vertically to clamp the buckle structure 2802 with the side bar of the frame for the pick-up truck bed cover.

The I-shaped structure 2601 of the tape 26 is inserted into the front and back bar 4, first left and right bar 4, second left and right bar 9, groove of the third left and right bar to fix the tape 26 on the front and back bar 4, first left and right bar 4, second left and right bar 9 as well as third left and right bar. The tape 26 is waterproof.

The bed cover of pick-up truck provided by this invention has a frame structure and the skin covering the frame structure. The frame structure consist of several frames and at least one rotating shaft system to connect two adjacent frames. And the rotating shaft system contains: a middle rod, a left joint, a right joint, a middle joint and a joint fixed plate. A rotating space is formed between the middle joint and the rotating shaft of the left joint as well as the right joint. And the rotation space is isolated from the hollow interior of the middle joint. The left joint and the right joint can be inserted into the rotating space with the rotating center of the rotating shaft part. The separation of the rotating space from the inner part of middle joint can prevent the water falling into the rotating space of the rotating shaft system from penetrating the inner part of the rotating shaft system. There is no need for additional waterproof bars in the rotating shaft system. The structure is simple with excellent waterproof performance. The structure is simple with excellent waterproof performance. The invention also has the advantages of original design, ingenious structures, simple and durable installation, solid waterproof tape etc.

While the description above contains many specificities, these specificities should not be construed as accordingly limiting the scope of the present invention but as merely providing illustrations of numerous presently preferred embodiments of this invention. Throughout the description and drawings, numerous exemplary embodiments were given with reference to specific configurations. It will be appreciated by those of ordinary skill in the art that the present invention can be embodied in numerous other specific forms and those of ordinary skill in the art would be able to practice such other embodiments without undue experimentation. The scope of the present invention, for the purpose of the present patent document, is hence not limited merely to the specific exemplary embodiments of the foregoing description, but rather is indicated by the following claims. Any and all modifications that come within the meaning and range of equivalents within the claims are intended to be considered as being embraced within the spirit and scope of the present invention.

What is claimed is:

1. A bed cover of pick-up truck, comprising:
   a frame structure; and
   a lid covering the frame structure;
   wherein said frame structure includes a plurality of frames, and each two adjacent frames are connected with a rotating shaft system; each rotating shaft system includes a middle rod, a left joint, a right joint, a middle joint and a joint fixing plate; the middle rod includes two parallel rods respectively connecting the left joint and the right joint, the middle joint defines two shaft grooves respectively at two opposite ends, each of the left joint, the right joint includes a rotating shaft part respectively rotatably received at the two shaft grooves, the joint fixing plate is fixed with the middle joint so as to restrict movement of the rotating shaft parts in an axial direction, at least one of the left joint, the right joint and the middle joint extends a plurality of spaced fin gaskets out from a bottom thereof.

2. The bed cover of pick-up truck according to claim 1, wherein each of the left joint and the right joint includes a connecting arm fixed with the rotating shaft part, the connecting arm is shaped to restrict rotating range of the rotating shaft part.

3. The bed cover of pick-up truck according to claim 2, wherein said middle joint includes a threaded protuberance, and the joint fixing plate defines a hole corresponding to the threaded protuberance, the middle joint is firmly connected with the joint fixing elate with a screw inserting through the hole and the threaded protuberance.

4. The bed cover of pick-up truck according to claim 1, wherein each frame includes two vertical bars and two or more horizontal bars; the vertical bars of adjacent two frames are connected by the rotating shaft system; the horizontal bars are fixed with the vertical bars by corner joints.

5. The bed cover of pick-up truck according to claim 4, wherein the left joint and the right joint respectively protrudes a square convex structure, and each of the two parallel rods of the middle rod defines a square cavity; said square convex structure is inserted into corresponding square cavity of the two parallel bars of the middle rod to fix the left, right joint with the middle rod.

6. The bed cover of pick-up truck according to claim 4, further comprising a stiffener system connecting between the two vertical bars.

7. The bed cover of pick-up truck according to claim 6, wherein each vertical bar define a cavity, the stiffener system includes two fixing blocks at two opposite ends, each fixing block protrudes a block plug configured to be inserted into the cavity so as to fix the stiffener system to the vertical bars, said stiffener defines a long groove extending along its length direction configured to accommodate two wrenches, the wrenches are configure to releasably engage with the frame of the pick-up truck.

8. The bed cover of pick-up truck according to claim 7, wherein said wrench comprises a supporting shell, a wrench shaft, a roller, a handle component, and a cylindrical thread bolt; the handle component comprises a handle rod which defines two parallel wrench mounting plates at a top thereof, the two parallel wrench mounting plates is perpendicular to the end of the handle rod; one end of the upper part of the wrench mounting plate defines a big hole, the other end is defines a small hole; the cylindrical thread bolt being received in the big hole of the two wrench mounting plate, the cylindrical thread bolt defines a thread hole between the two wrench mounting plates, a wrench rotating shaft received in the small hole of two wrench mounting plate, a roller is installed on the wrench rotating shaft between the two wrench mounting plates; the supporting shell protrudes wrench thread insert defining a through-hole communicating with the thread hole of the cylindrical thread bolt, the supporting shell defines a accommodating cavity; the supporting shell is provided with a buckle structure; operation of the handle component is capable of driving the vertical movement of the supporting shell.

9. The bed cover of pick-up truck according to claim 8, wherein said cylindrical thread bolt is connected with a binding head thread rod; the binding head thread rod is inserted into the support shell from the through-hole of the wrench thread insert to be engaged with the thread hole on the cylindrical thread bolt between the two wrench mounting plates through its thread section to fix the wrench with the binding thread rod.

10. The bed cover of pick-up truck according to claim 8, wherein said cylindrical thread bolt's rotation drives vertical movement of the handle component in the supporting shell; when the roller is against an inner wall surrounding the accommodating cavity in the supporting shell, the supporting shell is driven to move vertically to have the buckle structure engaged with the frame.

* * * * *